(12) United States Patent
Ishii et al.

(10) Patent No.: US 10,901,563 B2
(45) Date of Patent: *Jan. 26, 2021

(54) TOUCH PANEL SENSOR, TOUCH PANEL DEVICE AND DISPLAY DEVICE

(71) Applicant: Dai Nippon Printing Co., Ltd., Tokyo (JP)

(72) Inventors: Yasuhiko Ishii, Tokyo (JP); Yuichi Miyazaki, Tokyo (JP); Youichirou Oohashi, Tokyo (JP)

(73) Assignee: Dai Nippon Printing Co., Ltd, Shinjuku-Ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,460

(22) Filed: Dec. 5, 2019

(65) Prior Publication Data

US 2020/0110489 A1    Apr. 9, 2020

Related U.S. Application Data

(63) Continuation of application No. 16/518,052, filed on Jul. 22, 2019, now Pat. No. 10,521,063, which is a
(Continued)

(30) Foreign Application Priority Data

Jul. 11, 2012  (JP) ................. 2012-155685

(51) Int. Cl.
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01);
(Continued)

(58) Field of Classification Search
CPC ...... G06F 3/044; G06F 3/0412; G06F 3/0445; G06F 3/0446; G06F 2203/04103; G06F 2203/04112; G02F 1/13338
See application file for complete search history.

(56) References Cited

U.S. PATENT DOCUMENTS 4,087,625 A    5/1978  Dym et al.
5,113,041 A    5/1992  Blonder et al.
(Continued)

FOREIGN PATENT DOCUMENTS

EP    0 911 906 B1    3/2006
JP    S62-070473 A1    3/1987
(Continued)

OTHER PUBLICATIONS

International Search Report (Application No. PCT/JP2013/068836) dated Aug. 20, 2013 (with English translation).
(Continued)

*Primary Examiner* — Alexander Eisen
*Assistant Examiner* — Kebede T Teshome
(74) *Attorney, Agent, or Firm* — Burr & Brown, PLLC

(57) ABSTRACT

A touch panel sensor includes a substrate and an electrode having a detection electrode and an extraction electrode connected to a detection electrode. The electrode, in any cross-section thereof in the thickness direction, includes a metal layer which occupies at least part of the cross-section. The metal layer of the detection electrode and the metal layer of the extraction electrode are formed integrally at a joint between the detection electrode and the extraction electrode. The detection electrode includes a conductive mesh having conductive wire arranged in a mesh pattern, the conductive wire having a height of not less than 0.2 μm and not more than 2 μm and a width of not less than 1 μm and not more than 5 μm. The conductive wire of the conductive
(Continued)

mesh each have a base surface on the substrate side, and a flat top surface located opposite to the base surface.

19 Claims, 15 Drawing Sheets

Related U.S. Application Data continuation of application No. 15/957,069, filed on Apr. 19, 2018, now Pat. No. 10,416,826, which is a continuation of application No. 15/454,102, filed on Mar. 9, 2017, now Pat. No. 9,983,754, which is a continuation of application No. 14/413,984, filed as application No. PCT/JP2013/068836 on Jul. 10, 2013, now Pat. No. 9,639,219.

(52) U.S. Cl.
CPC ............. *G06F 2203/04103* (2013.01); *G06F 2203/04112* (2013.01)

(56) References Cited

U.S. PATENT DOCUMENTS

| | | |
|---|---|---|
| 5,126,007 A | 6/1992 | Shmulovich |
| 5,386,219 A | 1/1995 | Greanias et al. |
| 5,492,611 A | 2/1996 | Sugama et al. |
| 5,512,131 A | 4/1996 | Kumar et al. |
| 6,137,427 A | 10/2000 | Binstead |
| 6,188,391 B1 | 2/2001 | Seely et al. |
| 6,297,811 B1 | 10/2001 | Kent et al. |
| 6,472,804 B2 | 10/2002 | Mueller et al. |
| 6,522,463 B1 | 2/2003 | Shimomura et al. |
| 6,549,193 B1 | 4/2003 | Huang et al. |
| 6,775,907 B1 | 8/2004 | Boyko et al. |
| 6,919,881 B2 | 7/2005 | Chou |
| 7,129,935 B2 | 10/2006 | Mackey |
| 7,196,281 B2 | 3/2007 | Cok et al. |
| 7,202,859 B1 | 4/2007 | Speck et al. |
| 7,265,686 B2 | 9/2007 | Hurst et al. |
| 7,327,352 B2 | 2/2008 | Keefer et al. |
| 7,339,579 B2 | 3/2008 | Richter et al. |
| 7,393,472 B2 | 7/2008 | Lee et al. |
| 7,439,963 B2 | 10/2008 | Geaghan et al. |
| 7,737,617 B2 | 6/2010 | Miyazaki et al. |
| 7,820,078 B2 | 10/2010 | Louwet |
| 7,968,804 B2 | 6/2011 | Frey et al. |
| 8,179,381 B2 | 5/2012 | Frey et al. |
| 8,274,494 B2 | 9/2012 | Frey et al. |
| 8,603,611 B2 | 12/2013 | Wakabayashi et al. |
| 8,704,799 B2 | 4/2014 | Frey et al. |
| 9,285,405 B2 | 3/2016 | Cheng |
| 9,524,043 B2 | 12/2016 | Hwang et al. |
| 9,823,786 B2 | 11/2017 | Frey et al. |
| 2002/0130605 A1 | 9/2002 | Mueller et al. |
| 2003/0047535 A1 | 3/2003 | Schueller et al. |
| 2003/0067451 A1 | 4/2003 | Tagg et al. |
| 2003/0222857 A1 | 12/2003 | Abileah |
| 2003/0234770 A1 | 12/2003 | MacKey |
| 2004/0012570 A1 | 1/2004 | Cross et al. |
| 2004/0188150 A1 | 9/2004 | Richard et al. |
| 2004/0265550 A1 | 12/2004 | Glatkowski et al. |
| 2005/0003590 A1 | 1/2005 | Blees et al. |
| 2005/0041018 A1 | 2/2005 | Philipp |
| 2005/0076824 A1 | 4/2005 | Cross et al. |
| 2005/0153078 A1 | 7/2005 | Bentley et al. |
| 2005/0186405 A1 | 8/2005 | Jeong et al. |
| 2006/0007171 A1 | 1/2006 | Burdi et al. |
| 2006/0012575 A1 | 1/2006 | Knapp et al. |
| 2006/0038792 A1 | 2/2006 | Sano et al. |
| 2006/0097991 A1 | 5/2006 | Hotelling et al. |
| 2007/0018076 A1 | 1/2007 | Chen et al. |
| 2007/0059901 A1 | 3/2007 | Majumdar et al. |
| 2007/0074914 A1 | 4/2007 | Geaghan et al. |
| 2007/0128905 A1 | 6/2007 | Speakman |
| 2007/0160811 A1 | 7/2007 | Gaides et al. |
| 2007/0181878 A1 | 8/2007 | Song et al. |
| 2007/0200099 A1 | 8/2007 | Lee et al. |
| 2007/0236618 A1 | 10/2007 | Maag et al. |
| 2007/0242054 A1 | 10/2007 | Chang et al. |
| 2007/0247443 A1 | 10/2007 | Philipp |
| 2007/0257821 A1 | 11/2007 | Son |
| 2008/0041641 A1 | 2/2008 | Geaghan et al. |
| 2008/0062148 A1 | 3/2008 | Hotelling et al. |
| 2008/0095985 A1 | 4/2008 | Frey et al. |
| 2008/0095988 A1 | 4/2008 | Frey et al. |
| 2008/0138589 A1 | 6/2008 | Wakabayashi et al. |
| 2008/0150148 A1 | 6/2008 | Frey et al. |
| 2008/0158183 A1 | 7/2008 | Hotelling et al. |
| 2009/0002337 A1 | 1/2009 | Chang |
| 2009/0135146 A1 | 5/2009 | Scholz |
| 2009/0159344 A1 | 6/2009 | Hotelling et al. |
| 2009/0160783 A1 | 6/2009 | Yang et al. |
| 2009/0163256 A1 | 6/2009 | Wienke |
| 2009/0165296 A1 | 7/2009 | Carmi |
| 2009/0219257 A1 | 9/2009 | Frey et al. |
| 2010/0156840 A1 | 6/2010 | Frey et al. |
| 2010/0220074 A1 | 9/2010 | Irvin, Jr. et al. |
| 2011/0102361 A1 | 5/2011 | Philipp |
| 2011/0168432 A1 | 7/2011 | Chun et al. |
| 2012/0031647 A1 | 2/2012 | Hwang |
| 2012/0046887 A1 | 2/2012 | XiaoPing |
| 2012/0089348 A1 | 4/2012 | Perlin |
| 2012/0299865 A1 | 11/2012 | Yu |
| 2012/0313880 A1 | 12/2012 | Geaghan |
| 2013/0038572 A1 | 2/2013 | Frey et al. |
| 2013/0189502 A1 | 7/2013 | Takahashi et al. |
| 2014/0218053 A1 | 8/2014 | Ullmann et al. |
| 2015/0138151 A1 | 5/2015 | Moran et al. |

FOREIGN PATENT DOCUMENTS

| | | |
|---|---|---|
| JP | H02-126314 A1 | 5/1990 |
| JP | 2000-081510 A1 | 3/2000 |
| JP | 2002-014772 A1 | 1/2002 |
| JP | 2004-192093 A1 | 7/2004 |
| JP | 2005-084475 A1 | 3/2005 |
| JP | 2005-352638 A1 | 12/2005 |
| JP | 2006-286708 A1 | 10/2006 |
| JP | 2006-344163 A1 | 12/2006 |
| JP | 2007-048278 A1 | 2/2007 |
| JP | 2008-098169 A1 | 4/2008 |
| JP | 2011-513846 A1 | 4/2011 |
| JP | 2011-517355 A1 | 6/2011 |
| JP | 2011-141652 A1 | 7/2011 |
| JP | 4862969 B1 | 1/2012 |
| JP | 2012-094115 A1 | 5/2012 |
| KR | 10-2006-0017450 A | 2/2006 |
| KR | 10-0797092 A | 1/2008 |
| KR | 10-2010-0090669 A | 8/2010 |
| KR | 10-2011-0120157 A | 11/2011 |
| KR | 10-1111564 B1 | 2/2012 |
| WO | 2005/035438 A1 | 4/2005 |
| WO | 2005/114369 A2 | 12/2005 |
| WO | 2005/121940 A2 | 12/2005 |
| WO | 2009/089199 A2 | 7/2009 |

OTHER PUBLICATIONS

Taiwanese Office Action (Application No. 102124917) dated Sep. 12, 2016 (with English translation).
Korean Office Action (Application No. 10-2017-7012926) dated Jun. 8, 2018 (with English translation).
Notification of Reason for Revocation-Korean Patent Application No. 2015-7000373 (U.S. Pat. No. 2,008,047) dated Jul. 24, 2020 (with English translation).

BASE POINTS IN AN ABSOLUTE
COORDINATE SYSTEM

DISTRIBUTION OF BASE POINTS IN
A RELATIVE COORDINATE SYSTEM
(BASE POINT BP1 IS CENTERED)

DISTRIBUTION OF BASE POINTS IN
A RELATIVE COORDINATE SYSTEM
(BASE POINT BP2 IS CENTERED)

DISTRIBUTION OF BASE POINTS IN
A RELATIVE COORDINATE SYSTEM
(6 BASE POINTS ARE CENTERED)

TOUCH PANEL SENSOR, TOUCH PANEL DEVICE AND DISPLAY DEVICE

CROSS REFERENCE TO RELATED APPLICATIONS

This application is a continuation of U.S. patent application Ser. No. 16/518,052, filed Jul. 22, 2019, which is a continuation of U.S. application Ser. No. 15/957,069, filed Apr. 19, 2018, now U.S. Pat. No. 10,416,826, issued Sep. 17, 2019, which is a continuation of U.S. patent application Ser. No. 15/454,102, filed Mar. 9, 2017, now U.S. Pat. No. 9,983,754, issued May 29, 2018, which is a continuation of U.S. patent application Ser. No. 14/413,984, filed Jan. 9, 2015, now U.S. Pat. No. 9,639,219, issued May 2, 2017, which in turn is the National Stage entry of International Application No. PCT/JP2013/068836, filed Jul. 10, 2013, which designated the United States, the entireties of which are incorporated herein by reference.

BACKGROUND OF THE INVENTION

1. Field of the Invention

The present invention relates to a touch panel sensor having electrodes, and more particularly to a touch panel sensor whose electrodes have a low resistance and has thinned conductive wires. The present invention also relates to a touch panel device including the touch panel sensor, and to a display device including the touch panel sensor or the touch panel device.

2. Description of Related Art

These days touch panel devices are widely used as input means. A touch panel device includes a touch panel sensor, a control circuit for detecting a touch position on the touch panel sensor, wiring and an FPC (flexible printed circuit) substrate. In many cases, a touch panel device is used, together with an image display mechanism, as an input means for a variety of devices (e.g. a ticket vending machine, an ATM device, a mobile phone, a gaming device, etc.) into which the image display mechanism such as a liquid crystal display or a plasma display is incorporated. In such a device, a touch panel sensor is disposed on the display surface of the image display mechanism; the touch panel device enables direct input to a display device. An area of the touch panel sensor which faces the display area of the image display mechanism is made transparent. The transparent area of the touch panel sensor constitutes an active area capable of detecting a contact position (approaching position).

Touch panel devices can be classified into various types based on the principle of detecting a contact position (approaching position) on a touch panel sensor. A capacitive-coupled touch panel device is currently attracting attention because of its optical brightness, good design, easy structure, excellent function, etc. In a capacitive-coupled touch panel device, a parasitic capacitance is newly produced when an external conductor (typically a finger) whose position is to be detected comes into contact with (approaches) a touch panel sensor via a dielectric body. The touch panel device utilizes a change in the capacitance to detect the position of the external conductor on the touch panel sensor.

The touch panel sensor usually includes a substrate and electrodes provided on the substrate. The electrodes include detection electrodes located in an active area and extraction electrodes located in a non-active area. In many touch panel sensors, detection electrodes are disposed at positions facing the display area of an image display mechanism, as disclosed e.g. in JP 2008-98169A, and therefore are formed of a transparent conductive material such as ITO. Such a transparent conductive material has a relatively high refractive index. This can produce a large difference in light transmittance and light reflectance between an area of a touch panel sensor where detection electrodes are disposed and an area where no detection electrode is disposed. In the case where there is a large difference in light transmittance and light reflectance between the two areas, the contour of the detection electrodes will be visible to the user of the touch panel sensor, which is undesirable from the viewpoint of design and, in addition, will significantly lower the image quality of the display device.

Another known touch panel sensor uses detection electrodes made of a metal material. The detection electrodes are composed of conductive wires with a narrow width. The active area of the touch panel sensor can therefore be made to have a sufficiently high light transmittance. Further, because of the high electrical conductivity of the metal material, the surface resistivity (unit: $\Omega/\square$) of the touch panel sensor can be made sufficiently low even when the metal wires each have a narrow width. Such a touch panel sensor is generally produced by first laminating a metal foil onto a transparent substrate using an adhesive, and then patterning the metal foil by etching using a photolithography technique to form electrodes.

As the image quality of display devices becomes higher and small portable terminals, called tablets, become widespread these days, there is a strong demand for the use of thinner electrodes.

However, in the conventional touch panel sensor which uses electrodes composed of metal wires, the electrodes are produced by etching a metal foil using a patterned resist as a mask. An industrially-manufactured metal foil has a thickness of not less than 10 μm. Metal wires, which can be stably produced by etching a metal foil of such a thickness, have a width of at least 10 μm. This is because, as shown in FIG. 21, lateral erosion (side etching) inevitably occurs during etching of the metal foil, whereby adjacent eroded portions connect with each other below the resist. Once eroded portions connect each other below the resist, the corresponding portion of the resist cannot be stably supported any more. Consequently, a metal wire formed below the resist portion lacks in linearity and varies in the height (thickness).

Further, as shown in FIG. 21, the resulting metal wires have a triangular cross-sectional shape projecting from the substrate. Such metal wires have a narrow width and a low height, and therefore do not have a sufficiently high conductivity. Accordingly, the touch panel sensor has a high surface resistivity and thus has a low sensing sensitivity for positional detection. In addition, when such a touch panel sensor is incorporated into a touch panel device or a display device such that the projecting metal wires face the viewer, the metal wires having a necessary surface resistivity are likely to be visible. Accordingly, a dark/light pattern due to the metal wires of the touch panel sensor as well as moire due to interference between the metal wires and a pixel array in an image display mechanism, metal wires of another touch panel sensor, etc., are likely to be visible.

SUMMARY OF THE INVENTION

Thus, it has not been possible in the prior art to make metal wires, constituting electrodes, sufficiently thin. The present invention has been made in view of such a situation. It is therefore an object of the present invention to provide a touch panel sensor whose electrodes have a low resistance and includes thinned conductive wires.

A first touch panel sensor according to the present invention comprises:

a substrate; and an electrode provided on the substrate and having a detection electrode for use in positional detection and an extraction electrode connected to the detection electrode, wherein the electrode, in any cross-section thereof in a thickness direction, includes a metal layer which occupies at least part of the cross-section, wherein the metal layer of the detection electrode and the metal layer of the extraction electrode are formed integrally at a joint between the detection electrode and the extraction electrode, wherein the detection electrode includes a conductive mesh including a conductive wire which is arranged in a mesh pattern that defines a large number of open areas, the conductive wire having a height of not less than 0.2 μm and not more than 2 μm and a width of not less than 1 μm and not more than 5 μm, and wherein the conductive wire of the conductive mesh has a base surface on the substrate side, a flat top surface located opposite to the base surface, and a pair of side surfaces extending between the base surface and the top surface.

A second touch panel sensor according to the present invention comprises:

a substrate; and an electrode provided on the substrate and having a detection electrode for use in positional detection and an extraction electrode connected to the detection electrode, wherein the electrode, in any cross-section thereof in a thickness direction, includes a metal layer which occupies at least part of the cross-section, wherein the metal layer of the detection electrode and the metal layer of the extraction electrode are formed integrally at a joint between the detection electrode and the extraction electrode, wherein the detection electrode includes a conductive mesh including the conductive wire which is arranged in a mesh pattern that defines a large number of open areas, wherein the conductive wire of the conductive mesh has a base surface on the substrate side, a flat top surface located opposite to the base surface, and a pair of side surfaces extending between the base surface and the top surface, and wherein a width of each conductive wire of the conductive mesh changes such that it decreases in a direction from the top surface toward the base surface.

A third touch panel sensor according to the present invention comprises:

a substrate; and an electrode provided on the substrate and having a detection electrode for use in positional detection and an extraction electrode connected to the detection electrode, wherein the electrode, in any cross-section thereof in a thickness direction, includes a metal layer which occupies at least part of the cross-section, wherein the metal layer of the detection electrode and the metal layer of the extraction electrode are formed integrally at a joint between the detection electrode and the extraction electrode, wherein the detection electrode includes a conductive mesh including the conductive wire which is arranged in a mesh pattern that defines a large number of open areas, wherein the conductive wire of the conductive mesh has a base surface on the substrate side, a flat top surface located opposite to the base surface, and a pair of side surfaces extending between the base surface and the top surface, and wherein a width of the conductive wire of the conductive mesh is narrower at the base surface than at the top surface.

In any of the first to third touch panel sensors according to the present invention, the conductive wire of the conductive mesh may further include a blackened layer provided on the opposite side of the metal layer from the substrate and forming the top surface.

In any of the first to third touch panel sensors according to the present invention, the conductive wire of the conductive mesh may further include a blackened layer provided on the substrate side of the metal layer and forming the base surface.

In any of the first to third touch panel sensors according to the present invention, the width of the conductive wire of the conductive mesh may change such that it solely decreases in a direction from the top surface toward the base surface.

In any of the first to third touch panel sensors according to the present invention, the width of the conductive wire of the conductive mesh may first change such that it solely decreases in a direction from the top surface toward the base surface, and then change such that it solely increases in a direction from the top surface toward the base surface.

In any of the first to third touch panel sensors according to the present invention, the mesh pattern may have a large number of boundary segments each extending between two branch points, and the boundary segments define the open areas; and wherein, in the mesh pattern, the average of the number of boundary segments extending from each branch point may be not less than 3.0 and less than 4.0, and there may exist no direction in which open areas are arranged at a constant pitch.

In any of the first to third touch panel sensors according to the present invention, the mesh pattern may have a large number of boundary segments each extending between two branch points, and the boundary segments define the open areas, and, wherein, of the open areas contained in the mesh pattern, those open areas which are surrounded by 6 boundary segments may be contained most.

In any of the first to third touch panel sensors according to the present invention, the average of the number of boundary segments connected at each branch point may be more than 3.0.

In any of the first to third touch panel sensors according to the present invention, the average of the number of boundary segments connected at each branch point may be 3.0.

A touch panel device according to the present invention comprises any one of the above-described first to third touch panel sensors according to the present invention.

A display device according to the present invention comprises any one of the above-described first to third touch panel sensors according to the present invention or the above-described touch panel device according to the present invention.

According to the present invention, the conductive wires, constituting the electrode of the touch panel sensor, can be thinned while maintaining the electrode at a low resistance.

DETAILED DESCRIPTION OF THE INVENTION

Figure 1:
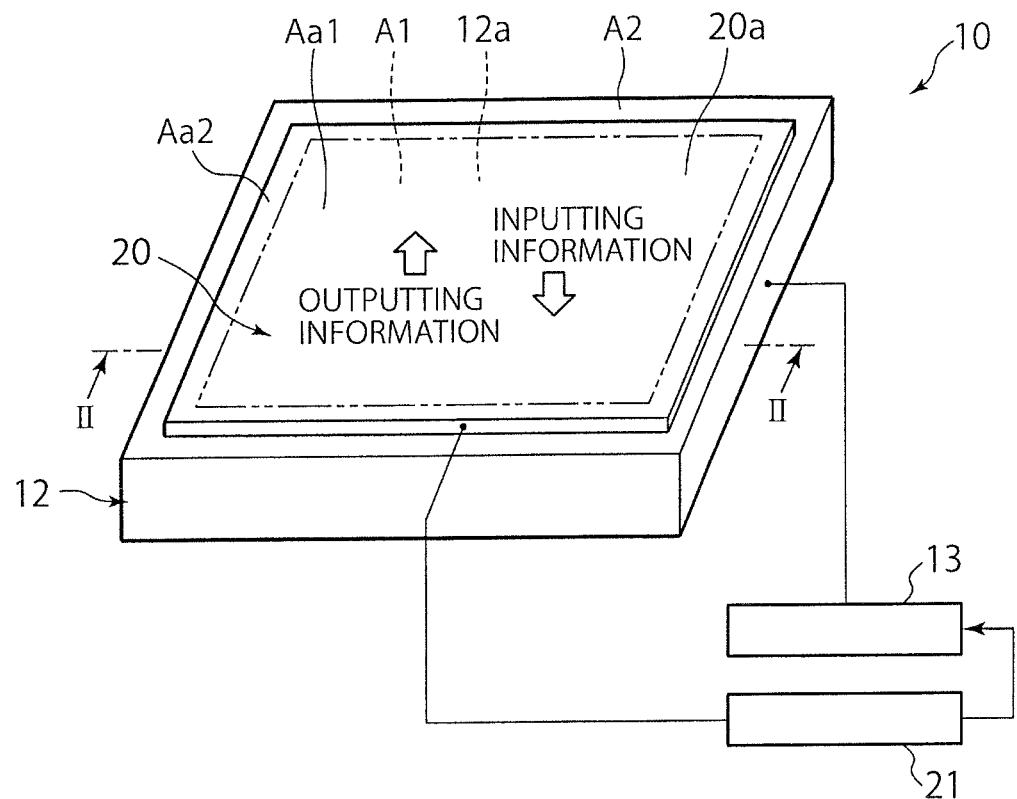
FIG. 1 is a diagram illustrating an embodiment of the present invention and schematically showing a touch panel device together with an image display mechanism.

Preferred embodiments of the present invention will now be described with reference to the drawings. In the drawings attached hereto, except for the photograph of FIG. 22, scales, horizontal to vertical dimensional ratios, etc. are exaggeratingly modified from those of the real things for the sake of illustration and easier understanding.

Figure 2:
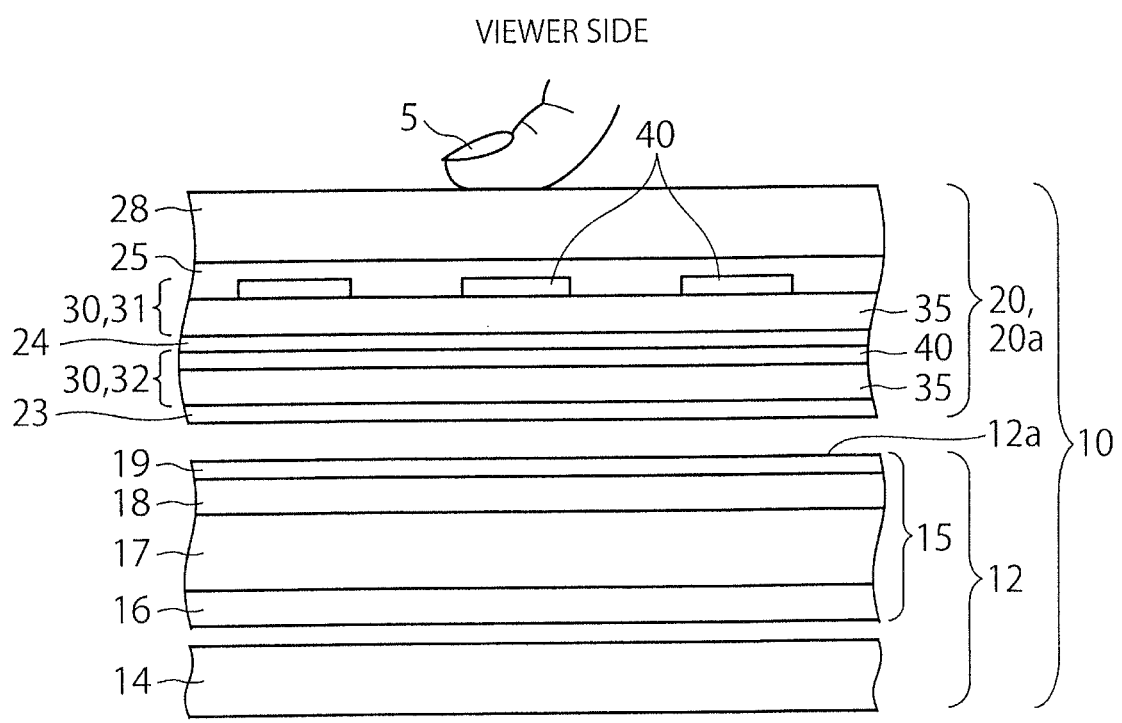
FIG. 2 is a cross-sectional view showing the touch panel device of FIG. 1 together with the image display mechanism, the cross-section approximately corresponding to a cross-section along the line II-II of FIG. 1.
Figure 3:
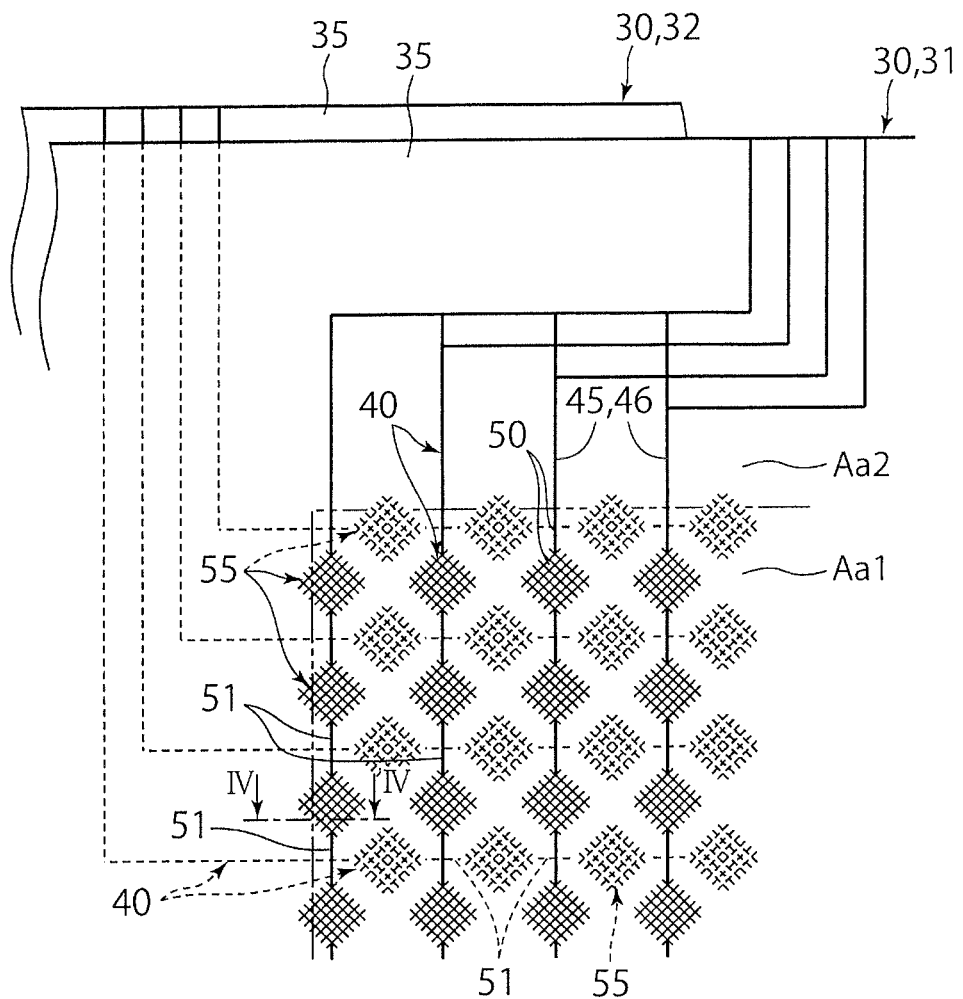
FIG. 3 is a top view showing the touch panel sensor of the touch panel device.
Figure 4:
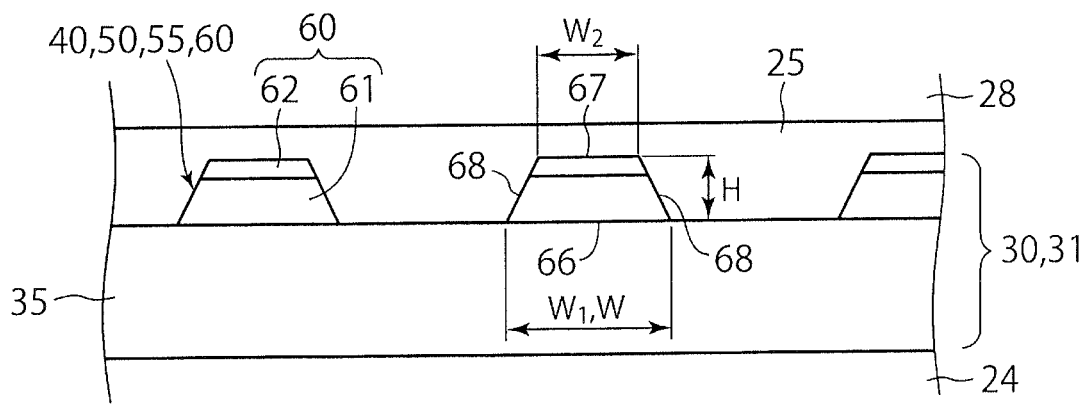
FIG. 4 is a cross-sectional view taken along the line IV-IV of FIG. 3.
Figure 5:
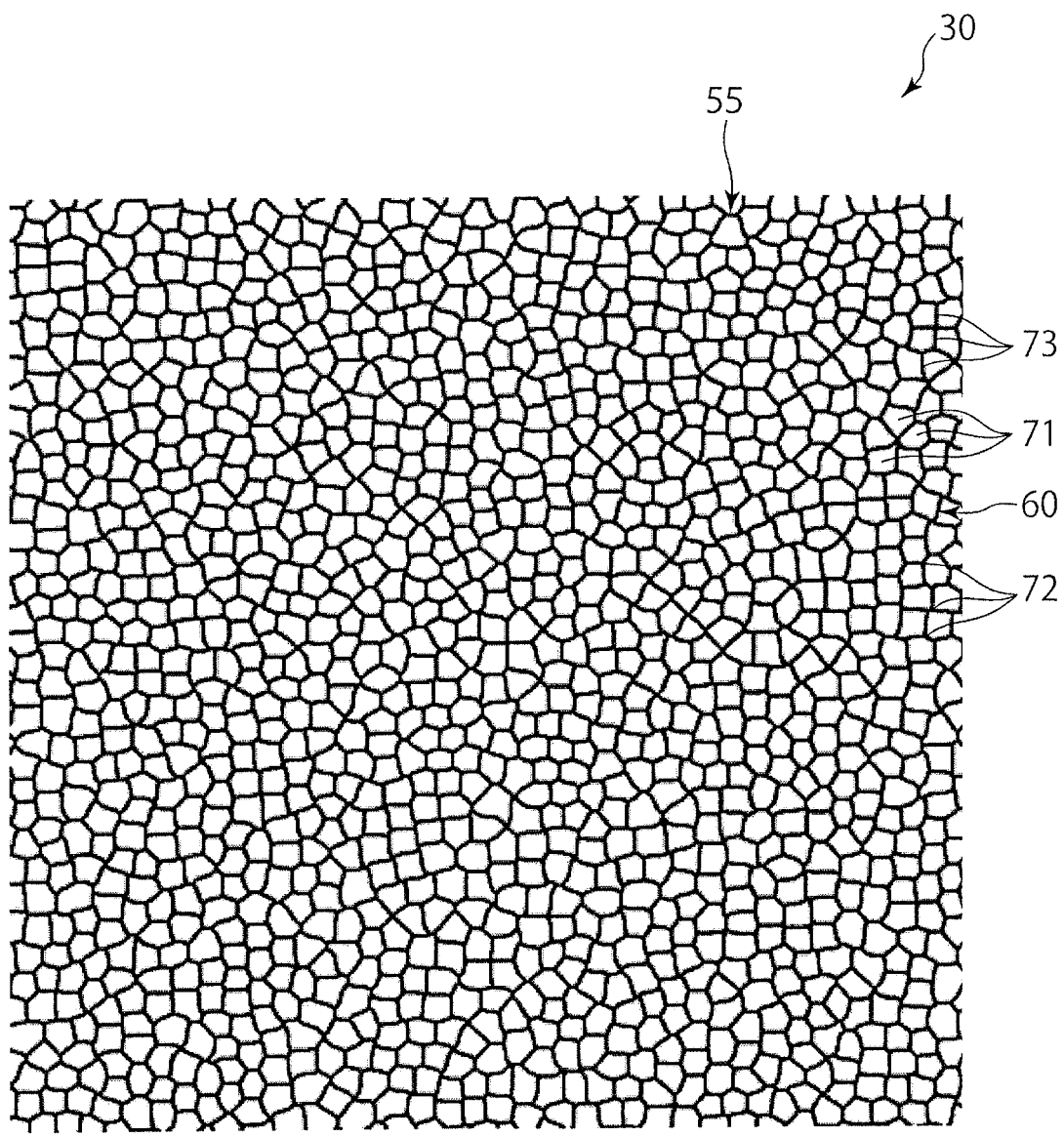
FIG. 5 is a diagram illustrating an exemplary mesh pattern in a plan view of a conductive mesh 55 contained in the touch panel sensor of FIG. 4.

FIGS. 1 through 14 are diagrams illustrating an embodiment of the present invention. In particular, FIG. 1 is a diagram schematically showing a touch panel device together with a display device; FIG. 2 is a cross-sectional view showing the touch panel device of FIG. 1 together with the display device; FIGS. 3 and 4 are a top view and a cross-sectional view, respectively, showing the touch panel sensor of the touch panel device; and FIG. 5 is a plan view illustrating an exemplary mesh pattern of a conductive mesh provided in the touch panel sensor.

The touch panel device 20 shown in FIGS. 1 through 4 is constructed as a projection capacitance-coupled touch panel device and configured to be capable of detecting a contact position of an external conductor (e.g. a human finger) on the touch panel device. When the capacitance-coupled touch panel device 20 has an excellent detection sensitivity, it can detect an area of the touch panel device to which an external conductor is approaching. In view of this, the term "contact position" as used herein includes an approaching position which can be detected without actual contact of an external conductor with the position.

<<<Image Display Mechanism 12>>>

As shown in FIGS. 1 and 2, the touch panel device 20 is used in combination with an image display mechanism (e.g. a liquid crystal display device) 12 to constitute a display device 10. The illustrated image display mechanism 12 is, for example, constructed as a flat panel display, more specifically as a liquid crystal display device. The image display mechanism 12 includes a liquid crystal display panel 15 having a display surface 12a, a backlight 14 for illuminating the liquid crystal display panel 15 from the back, and a display control section 13 connected to the liquid crystal display panel 15. The liquid crystal display panel 15 includes a display area A1 capable of displaying images, and a non-display area (also called a frame area) disposed outside the display area A1 such that it surrounds the display area A1. The display control section 13 processes information on an image to be displayed and, based on the image information, drives the liquid crystal display panel 15. Based on a control signal from the display control section 13, the liquid crystal display panel 15 displays a predetermined image on the display surface 12a. Thus, the image display mechanism 12 plays a role as an output device for outputting textual or graphical information in the form of an image.

As shown in FIG. 2, the liquid crystal display panel 15 includes a pair of polarizing plates 16, 18 and a liquid crystal cell 17 disposed between the pair of polarizing plates 16, 18. A functional layer 19 is provided on the light exit side of the polarizing plate 18 disposed on the light exit side. The functional layer 19 is a layer which is expected to perform a particular function, and forms the outermost light exit-side surface, i.e. the display surface 12a, of the image display mechanism 12. The functional layer 19 may be, for example, a low-refractive index layer that functions as an antireflection layer (AR layer). Instead of or in addition to the antireflection layer, the functional layer 19 may consist of one or more of an anti-glare layer (AG layer) having an anti-glare function, an abrasion-resistant hard coat layer (HC layer), an antistatic layer (AS layer) having an antistatic function, etc.

The polarizing plates 16, 18 include polarizers which function to resolve incident light into two orthogonal polarization components, and transmit one polarization component and absorbs the other polarization component perpendicular to the one polarization component. In the following description, in order to distinguish between the pair of polarizing plates contained in the liquid crystal display panel 15, the light entrance-side (backlight-side) polarizing plate 16 is referred to as the lower polarizing plate and the light exit-side (viewer-side) polarizing plate 18 is referred to as the upper polarizing plate regardless of the posture of the liquid crystal display panel 15.

The liquid crystal cell 17 includes a pair of support plates and liquid crystals disposed between the pair of support plates. The liquid crystal cell 17 is configured to be capable of applying an electric field to each pixel area. When an electric field is applied to a pixel area, then the orientation of liquid crystals of the liquid crystal cell 17 changes in the pixel area. For example, a polarization component in a particular direction (direction parallel to the transmission axis), which has passed through the lower polarizing plate 16 disposed on the light entrance side, turns its polarization direction by 90 degrees when it passes through those pixel areas of the liquid crystal cell 17 to which an electric field is being applied, whereas the polarization component maintains its polarization direction when it passes through those pixel areas of the liquid crystal cell 17 to which no electric field is being applied. Thus, transmission through or absorption and blocking by the upper polarizing plate 18, disposed on the light exit side of the lower polarizing plate 16, of the polarization component in the particular direction, which has passed through the lower polarizing plate 16, can be controlled by application or no application of an electric field to each pixel area of the liquid crystal cell 17.

The backlight 14 includes a light source, and planarly emits light. A known surface light source device, constructed as the edge-light type (side-light type) or the direct-light type, can be used as the backlight 14. The light source may be a known one composed of light emitting diodes (LEDs), a cold-cathode tube, an incandescent lamp, an organic EL emitter, etc.

<<<Touch Panel Device 20>>>

The touch panel device 20 will now be described. The touch panel device 20 comprises a laminate 20a including touch panel sensors 30, and a detection control section 21 connected to the touch panel sensors 30. The laminate 20a including the touch panel sensors 30 is disposed at a position facing the display surface 12a of the image display mechanism 12. As described above, the touch panel device 20 is constructed as a projection capacitive-coupled touch panel device, and plays a role as an input device for inputting information.

In the embodiment illustrated in FIG. 2, the laminate 20a of the touch panel device 20 is composed of a cover layer 28, an adhesive layer 25, a first touch panel sensor 31, an adhesive layer 24, a second touch panel sensor 32, and a low-refractive index layer 23, arranged in this order from the viewer side, i.e. from the opposite side from the image display mechanism 12. Thus, in the embodiment illustrated in FIG. 2, the touch panel device 20 has two touch panel sensors 30.

The cover layer 28 is a light transmissive layer which functions as a dielectric body, and may be comprised of, for example, a glass or resin film. The cover layer 28 functions as an input surface (tough surface, contact surface) to the touch panel device 20: information from outside can be inputted into the touch panel device 20 by bringing a conductor, e.g. a human finger 5, into contact with the cover layer 28. The cover layer 28 forms the outermost viewer-side surface of the display device 10 and functions, in the display device 10, as a cover to protect the touch panel device 20 and the image display mechanism 12 from the outside.

The cover layer 28 is bonded via the adhesive layer 25 to the first touch panel sensor 31. The first touch panel sensor 31 is bonded via the adhesive layer 24 to the second touch panel sensor 32. The adhesive layer 24 and the adhesive layer 25 function as a dielectric body between electrodes 40, provided in the first touch panel sensor 31 and the second touch panel sensor 32, and a conductor, e.g. a human finger 5, in contact with the cover layer 28. Various adhesive materials may be used for the adhesive layer 24 and the adhesive layer 25. The term "adhesive (layer)" as used herein includes the meaning of glue (layer).

The low-refractive index layer 23, provided on the image display mechanism 12 side of the second touch panel sensor 32, is a layer which is expected to function as an antireflection layer (AR layer). The low-refractive index layer 23 can prevent image-forming light from the image display mechanism 12 from reflecting from the image display mechanism 12-side surface of the touch panel device 20 and becoming stray light. The low-refractive index layer 23 may be replaced with an antireflection layer having a moth-eye structure comprising a large number of microprotrusions, or may be omitted. It is possible to bond the laminate 20a of the touch panel device 20 to the display surface 12a of the image display mechanism 12 e.g. via an adhesive layer. In that case, the low-refractive index layer 23 is not necessary.

Besides the layers illustrated, the laminate 20a of the touch panel device 20 may comprise an additional functional layer(s) which is expected to perform a particular function. It is possible to use a functional layer that performs two or more functions. It is possible to impart a function to a layer(s) (substrate(s) or adhesive layer(s)), e.g. the below-described substrates 35 of the touch panel sensors 30, contained in the laminate 20a. Examples of functions which can be imparted to the laminate 20a of the touch panel device 20 include an anti-glare (AG) function, an abrasion-resistant hard coat (HC) function, an antistatic (AS) function, an electromagnetic wave-shielding function, an anti-fouling function, etc.

The detection control section 21 of the touch panel device 20 is connected to the touch panel sensors 30, and processes information inputted via the cover layer 28. The detection control section 21 includes a circuit (detection circuit) configured to be capable of identifying a contact position of a conductor (typically a human finger) 5 on the cover layer 28 upon contact of the conductor 5 with the cover layer 28. Further, the detection control section 21 is connected to the display control section 13 of the image display mechanism 12, so that processed input information can be transmitted to the display control section 13. The display control section 13 can prepare image information based on the input information and cause the image display mechanism 12 to display an image corresponding to the input information.

The term "capacitive-coupled" and the term "projection" capacitive-coupled as used herein each have the same meaning as used in the technical field of touch panels. The term "capacitive-coupled" is also referred to as "capacitance", "capacitance-coupled", etc. in the technical field of touch panels; the term "capacitive-coupled" as used herein has the same meaning as "capacitance", "capacitance-coupled", etc. A typical capacitance-coupled touch panel device includes electrodes (conductive layer). Upon contact of an external conductor (typically a human finger) with a touch panel, a capacitance is formed between the external conductor and an electrode (conductive layer) of the touch panel device. Based on a change in the electrical state due to the formation of the condenser, the positional coordinates of the contact position of the external conductor on the touch panel can be identified (detected).

<<Touch Panel Sensor 30>>

The touch panel sensor 30 will now be described in detail. As shown in FIGS. 2 and 3, the touch panel sensor 30 includes a sheet-like substrate 35 and electrodes 40 formed on the substrate 35. In the embodiment illustrated in FIG. 2, the electrodes 40 are provided on the one-side (viewer-side) surface of the substrate 35.

The touch panel device 20 shown in FIG. 2 comprises the first touch panel sensor 31 and the second touch panel sensor 32. The first touch panel sensor 31 and the second touch panel sensor 32 can have the same construction except that the electrodes 40 are arranged in different patterns. In the following description, those components which are equal between the first touch panel sensor 31 and the second touch panel sensor 32 will be described as components of the touch panel sensor 30 without distinguishing between the first touch panel sensor 31 and the second touch panel sensor 32.

<Substrate 35>

The substrate 35 supports the electrodes 40, and functions as a dielectric body in the touch panel sensor 30. As shown in FIGS. 1 and 3, the substrate 35 consists of an active area Aa1 corresponding to an area capable of detecting a touch position, and a non-active area Aa2 lying adjacent to the active area Aa1. As shown in FIG. 1, the active area Aa1 of the touch panel sensor 30 occupies the area facing the display area A1 of the image display mechanism 12. On the other hand, the non-active area Aa2 is formed such that it entirely surrounds the periphery of the rectangular active area Aa1, in other words, formed in a frame-like shape. The non-active area Aa2 is formed in an area which faces the non-display area A2 of the image display mechanism 12.

As will be described in more detail below, the electrodes 40 are composed of detection electrodes 50 for use in positional detection, and extraction electrodes 45 connected to the detection electrodes 50. As shown in FIG. 3, the detection electrodes 50, which can form a capacitive coupling between it and an external conductor 5, are provided in the active area Aa1 of the substrate 35, while the extraction electrodes 45 connected to the detection electrodes 50 are provided in the non-active area Aa2 of the substrate 35.

The substrate 35 is transparent or translucent so that an image on the image display mechanism 12 can be viewed through the active area Aa1. The light transmittance of the substrate 35 in the visible light range is preferably not less than 80%, more preferably not less than 84%. The light transmittance of the substrate 35 can be measured according to JIS K7361-1 (test method for determining the total light transmittance of transparent plastic material).

The substrate 35 may be formed of, for example, a glass or resin film which can function as a dielectric body. Various resin films which are commonly used for the substrates of optical members can be preferably used as the resin film. For example, an optically isotropic film having no birefringence, typically a film of a cellulose ester as typified by triacetyl cellulose can be used as the substrate 35. On the other hand, an optically anisotropic film having birefringence can also be used as the substrate 35. For example, a polyester film such as a polyethylene terephthalate (PET) film, which is inexpensive and has excellent stability, can be used as the substrate 35. A polyester film has the advantage that because of its low hygroscopic properties, deformation hardly occurs even in a hot and humid environment.

(Optical Anisotropy of the Substrate)

When the touch panel sensor 30 and the touch panel device 20 are used in combination with the image display mechanism 12 in which a particular polarization component serves as image-forming light as in the illustrated embodiment, the use of an optically anisotropic film, as typified by a polyester film, as the substrate 35 can cause the problem of the occurrence of a visible multi-color pattern (hereinafter also referred to as "rainbow pattern"). In this regard, it has been found in the present inventors' studies that a rainbow pattern can be effectively obscured by using an optically anisotropic birefringent substrate 35 having a total retardation of not less than 6000 nm. This will be described in more detail below. Also for the cover layer 28 lying on the viewer side of the image display mechanism 12, the use of an optically anisotropic film as described herein is effective for preventing a rainbow pattern.

From the viewpoint of preventing a rainbow pattern, the retardation of the substrate 35 is preferably not less than 6000 nm. On the other hand, there is no particular limitation on the upper limit of the retardation of the substrate 35; however, the upper limit is preferably about 30000 nm. If the retardation of the substrate 35 exceeds 30000 nm, there will be no further appreciable improvement in the prevention of a rainbow pattern and, in addition, the substrate 35 tends to be thick. Thus, from the viewpoints of prevention of a rainbow pattern and thinning of the substrate 35, the retardation of the substrate 35 is preferably 10000 to 20000 nm.

The retardation (Re) as used herein is represented by the following formula (1):

$$\text{Retardation (Re)}=(n_x-n_y)\times d \tag{1}$$

where $n_x$ represents the refractive index of the substrate 35 in the direction (slow axis direction) in which the refractive index is maximum in the plane of the substrate 35, $n_y$ represents the refractive index in the direction (fast axis direction) perpendicular to the slow axis direction, and d represents the thickness of the substrate 35.

The retardation value can be measured, for example, by using KOBRA-WR, manufactured by Oji Scientific Instruments, under the conditions of measurement angle 0° and measurement wavelength 548.2 nm.

The value of $(n_x-n_y)$ (hereinafter also expressed as $\Delta n$) in the above formula (1) is preferably not less than 0.05. If the $\Delta n$ value is less than 0.05, a sufficient rainbow pattern preventing effect may not be achieved. Furthermore, an undesirably large thickness of the substrate 35 is required in order to obtain the above-described retardation value. In more preferably, the lower limit of the $\Delta n$ value is 0.07.

A resin material for the optically anisotropic substrate 35 is not particularly limited if it can satisfy the above-described retardation condition. A preferable example of the resin material may be one selected from the group consisting of a polyester resin, a polyolefin resin, a (meth)acrylic resin, a polyurethane resin, a polyether sulfone resin, a polycarbonate resin, a polysulfone resin, a polyether resin, a polyether ketone resin, a (meth)acrylonitrile resin, and a cycloolefin resin.

A method for obtaining the optically anisotropic substrate 35 is not particularly limited if it can satisfy the above-described retardation condition. For example, when the substrate 35 is made of a polyester film, a usable method comprises melting and extruding a polyester resin into a sheet, laterally stretching the unstretched polyester sheet using e.g. a tenter at a temperature higher than the glass transition temperature, and then subjecting the stretched polyester sheet to heat treatment. The retardation of the transparent substrate produced by this method can be controlled at not less than 6000 nm by appropriately setting the stretch ratio, the stretch temperature, and the thickness of the transparent substrate. A higher retardation can be obtained by setting a higher stretch ratio, a lower stretch temperature and a larger substrate thickness. Conversely, a lower retardation can be obtained by setting a lower stretch ratio, a higher stretch temperature and a smaller substrate thickness.

While the thickness of the substrate 35 may be appropriately determined depending on the constituent material, etc., it is preferably in the range of 20 to 500 μm. If the thickness is less than 20 μm, the retardation of the substrate 35 sometimes cannot be made not less than 6000 nm. Further, the mechanical properties of the substrate 35 may be significantly anisotropic, and therefore the substrate 35 is likely to tear or break. Thus, the usefulness of the substrate as an industrial material can significantly decrease. On the other hand, if the thickness exceeds 500 μm, the substrate will be very rigid and lack the flexibility peculiar to a polymer film. Thus, again, the usefulness of the substrate as an industrial material can significantly decrease. The thickness of the substrate is more preferably not less than 30 μm and not more than 400 μm, yet more preferably not more than 300 μm.

It has been found in the present inventors' studies that in combination with the image display mechanism 12 comprised of a liquid crystal display device, the touch panel sensor 30 is preferably positioned with respect to the liquid crystal display panel 15 such that the angle formed between the slow axis of the optically anisotropic substrate 35 of the touch panel sensor 30 and the absorption axis of the upper polarizing plate 18 of the image display mechanism 12 is in the range of 0°±30° or 90°±30°, more preferably in the range of 0°±10° or 90°±10°, yet more preferably in the range of 0°±7° or 90°±7°, still more preferably in the range of 0°±3° or 90°±3°, and most preferably 0° or 90°. It has been found that the occurrence of a rainbow pattern can be very effectively prevented by setting the angle formed between the slow axis of the optically anisotropic substrate 35 of the touch panel sensor 30 and the absorption axis of the upper polarizing plate 18 of the image display mechanism 12 in the above-described range.

<Electrodes 40>

The electrodes 40 of the touch panel sensor 30, provided on the substrate 35, will now be described.

As described above, the electrodes 40 are composed of detection electrodes 50 for use in positional detection, and extraction electrodes 45 connected to the detection electrodes 50.

The electrodes 40 are formed of a material having electrical conductivity, and are electrically connected to the detection circuit of the detection control section 21 which is configured to detect a contact position of an external conductor 5 on the cover layer 28. In the embodiment illustrated in FIG. 3, the electrodes 40 comprise a large number of detection electrodes 50 disposed in the active area Aa1 of the substrate 35, and a large number of extraction electrodes 45 connected to the detection electrodes 50 and disposed in the non-active area Aa2 of the substrate 35.

(The Overall Construction of Detection Electrodes 50)

The detection electrodes 50 of the first touch panel sensor 31 are arranged in a predetermined pattern on the one-side (viewer-side) surface of the substrate 35 of the first touch panel sensor 31. The detection electrodes 50 of the second touch panel sensor 32 are arranged, in a pattern different from that of the detection electrodes 50 of the first touch panel sensor 31, on the one-side (viewer-side) surface of the substrate 35 of the second touch panel sensor 32. More specifically, as shown in FIG. 3, the detection electrodes 50 of the first touch panel sensor 31, when viewed macroscopically, are constructed as linearly extending conductive wires (conductors) arranged in one direction along the sheet plane of the first touch panel sensor 31. On the other hand, the detection electrodes 50 of the second touch panel sensor 32, when viewed macroscopically, are constructed as linearly extending conductive wires (conductors) arranged in another direction, intersecting the one direction, along the sheet plane of the second touch panel sensor 32. In the illustrated embodiment, the one direction in which the detection electrodes 50 of the first touch panel sensor 31 are arranged is, on the panel plane of the touch panel sensor 20, perpendicular to the another direction in which the detection electrodes 50 of the second touch panel sensor 32 are arranged.

As shown in FIG. 3, in the first touch panel sensor 31 and the second touch panel sensor 32, the conductive wires constituting the detection electrodes 50 of the electrodes 40 each extend linearly in a direction intersecting the direction (the one direction or the another direction) in which the conductive wires are arranged. Particularly in the illustrated embodiment, the detection electrodes 50 each extend in a linear direction perpendicular to the arrangement direction.

In the embodiment illustrated in FIG. 3, the detection electrodes 50 of the electrodes 40 each comprise a large number of spaced-apart conductive meshes 55 arranged with spaces in the longitudinal direction of the detection electrode 50, and connecting wires 51 each connecting two adjacent conductive meshes 55. Each detection electrode 50, consisting of the conductive meshes 55 and the connecting wires 51, extend linearly in the active area Aa1. As described below, in each conductive mesh 55, thin conductive wires 60 are arranged in a mesh pattern that defines a large number of open areas 71. As shown in FIG. 3, the width of each detection electrode 50 is large in those portions where the conductive meshes 55 are disposed. The conductive meshes 55 of each detection electrode 50, shown in FIG. 3, each have an approximately square contour in a plan view.

As shown in FIG. 3, when viewed in the normal direction to the panel plane of the touch panel device 20 (i.e. in a plan view), each detection electrode 50 contained in the first touch panel sensor 31 intersects with the large number of detection electrodes 50 contained in the second touch panel sensor 32. As shown in FIG. 3, the conductive meshes 55 of each detection electrode 50 of the first touch panel sensor 31 are each disposed between two points of intersection between the detection electrode 50 and two adjacent detection electrodes 50 of the second touch panel sensor 32. Similarly, when viewed in the normal direction to the panel plane of the touch panel device 20 (i.e. in a plan view), each detection electrode 50 contained in the second touch panel sensor 32 intersects with the large number of detection electrodes 50 contained in the first touch panel sensor 31. The conductive meshes 55 of each detection electrode 50 of the second touch panel sensor 32 are each disposed between two points of intersection between the detection electrode 50 and two adjacent detection electrodes 50 of the first touch panel sensor 31. Further, in the illustrated embodiment, the conductive meshes 55 of the detection electrodes 50 contained in the first touch panel sensor 31 and the conductive meshes 55 of the detection electrodes 50 contained in the second touch panel sensor 32, when viewed in the normal direction to the panel plane of the touch panel device 20 (i.e. in a plan view), are disposed such that they do not overlap. Thus, when viewed in the normal direction to the panel plane of the touch panel device 20 (i.e. in a plan view), the detection electrodes 50 contained in the first touch panel sensor 31 intersect with the detection electrodes 50 contained in the second touch panel sensor 32 only in the connecting conductive wires 51 of the detection electrodes 50.

(Conductive Meshes 55)

The conductive meshes 55 form the thick portions of the detection electrodes 50, making it possible to detect with high sensitivity an external conductor 5 (e.g. a finger) in contact with a region, having a certain area, of the cover layer 28. On the other hand, the active area Aa1 in which the detection electrodes 50 are provided lies over the display area A1 of the image display mechanism 12, and therefore needs to have a certain level of permeability to visible light. To ensure permeability to visible light, in the areas of the conductive meshes 55, thin conductive wires 60 made of a metal material having a high electrical conductivity are arranged in a mesh pattern.

As shown in FIG. 5, the thin conductive wires 60 of each conductive mesh 55 have a large number of branch points 72. The thin conductive wires 60 of each conductive mesh 55 are constructed as an assembly of a large number of boundary segments 73 which each form branch points 72 at both ends. That is, the thin conductive wires 60 of each conductive mesh 55 are constructed as an assembly of a large number of boundary segments 73 each extending between two branch points 73. The boundary segments 73, which are connected at the branch points 73, define open areas 71. In other words, each open area 71 is surrounded and defined by a number of boundary segments 73.

As shown in FIG. 5, in this embodiment the thin conductive wires 60 consist only of the boundary segments 73: there is no thin conductive wires 60 extending into the open areas 71. This can effectively provide the touch panel sensor 30 with both a sufficient sensitivity for positional detection and a high visible light transmittance.

(Mesh Pattern of Conductive Mesh 55)

Pixels for forming an image are regularly arranged in the display area A1 of the image display mechanism 12, superimposed on the touch panel sensor 30. Because of the lamination of the image display mechanism 12 having the pixel array and the touch panel sensor 30 having the conductive meshes 55, a stripe pattern, or moire, can appear due to the regular (periodic) pixel pattern and the arrangement pattern of the open areas 71 of each conductive mesh 55. In addition, a dark/light pattern can appear due to variation in the density of the open areas 71. Various methods are known to prevent the occurrence of moire and a dark/light pattern; and such known methods may be appropriately applied to the conductive meshes 55.

On the other hand, it has been found in the present inventors' studies that moire can be very effectively prevented and, at the same time, a dark/light pattern can be very effectively prevented by devising an arrangement pattern of the thin conductive wires 60 in each conductive mesh 55. The arrangement pattern of the thin conductive wires 60 in each conductive mesh 55 in a plan view will now be described.

FIGS. 5 through 8 are diagrams illustrating an exemplary mesh pattern in each conductive mesh 55. In the illustrated conductive mesh 55, in order to prevent the occurrence of moire, there exists no linear direction in which open areas 71 are arranged at a pitch with repetition regularity (periodicity). It has been found in the present inventors' studies that moire which can be produced when the touch panel sensor 30 having the conductive meshes 55 is superimposed on the image display mechanism 12 having the pixel array, or moire which can be produced when the two touch panel sensors 30 each having the conductive meshes 55 are superimposed on each other, can be very effectively obscured not by merely making the pattern of each conductive mesh 55 irregular, but by designing the pattern of each conductive mesh 55 in such a manner that there exists no linear direction in which open areas 71 are arranged at a constant pitch.

Figure 6:
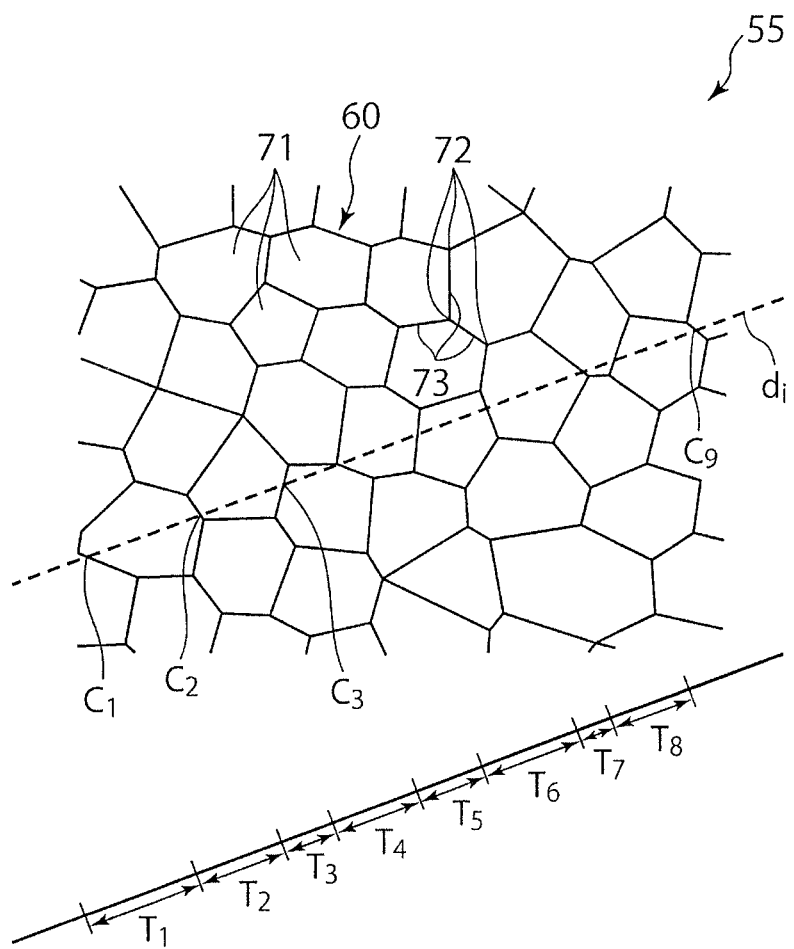
FIG. 6 is an enlarged view of the conductive mesh, illustrating the mesh pattern of the conductive mesh.

FIG. 6 is a plan view illustrating a mesh pattern in which there exists no direction in which open areas 71 are arranged at a constant pitch, in other words, open areas 71 are regularly arranged, or in other words, open areas 71 are lined up with regularity. In FIG. 6, a hypothetical line $d_i$, extending in an arbitrary position and in an arbitrary direction, is selected on the sheet plane of the touch panel sensor 30. The line $d_i$ intersects with boundary segments 73 and forms points of intersection. The points of intersection are indicated as cross-points $C_1, C_2, C_3, \ldots C_9$, numbered from the lower-left one in FIG. 6. The distance between two adjacent cross-points, e.g. cross-point $C_1$ and cross-point $C_2$, is the size $T_1$ of an open area 71 on the line $d_i$. For another open area 71 lying adjacent to the open area 71 of the size $T_1$ along the line $d_i$, the size $T_2$ of the open area 71 on the line $d_i$ can be determined in the same manner. In this manner, for the line $d_i$ extending in an arbitrary position and in an arbitrary direction, the sizes $T_1, T_2, T_3, \ldots T_8$ of those open areas 71 which the line $d_i$ pass across can be determined. There is no periodicity (regularity) in the line of the numerical values $T_1, T_2, T_3, \ldots T_8$. Thus, the open areas 71 are arranged along the linear direction $d_1$ with no regularity and, in addition, the following condition is met:

$$T_k \ne T_{k+l} \text{ (}k\text{: arbitrary natural number, }l\text{: arbitrary natural number)} \quad (x)$$

For easier understanding, the $T_1, T_2, T_3, \ldots T_8$, together with the line $d_i$, are depicted at the bottom of FIG. 6 separately from the conductive mesh 55.

When the sizes $T_1, T_2, \ldots$ of open areas 71 are determined for a hypothetical line $d_{i+1}$ extending in a direction determined by rotating the line $d_i$ shown in FIG. 6 through an arbitrary angle, the condition (x) is met also for the line $d_{i+1}$, and there is no repetition periodicity (regularity) in the sizes $T_1, T_2, \ldots$. In the case where open areas 71 meet the condition (x) in any direction, the mesh pattern is herein expressed as "there exists no direction in which open areas 71 are arranged at a constant pitch" or "there exists no direction in which open areas 71 are regularly arranged" or "there exists no direction in which open areas 71 are arranged with repetition periodicity" or "open areas 71 are arranged with no regularity".

To make the pattern of each conductive mesh irregular is generally considered to be effective for preventing the occurrence of moire. However, it has been found in the present inventors' studies that moire cannot be always sufficiently obscured by merely making irregular the shape and the arrangement pitch of the pattern of each conductive mesh. It has also been found that even if moire can be obscured, a dark/light pattern can sometimes occur in the conductive meshes.

On the other hand, it has been found that the occurrence of moire can be effectively prevented and the occurrence of a dark/light pattern can also be effectively prevented if, as with the pattern of each conductive mesh 55 according to this embodiment, the pattern of each conductive mesh 55 is designed in such a manner that there exists no linear direction in which open areas (closed circuits) 71 are arranged at a constant pitch and, in addition, if a restriction is imposed on the average of the number of boundary segments 73 extending from each branch point 72 as will be described below. Such technical effects are considered to be remarkable and unexpected ones in view of the technical level of the prior art in which merely making the mesh pattern irregular has been practiced in order to prevent moire.

Figure 7:
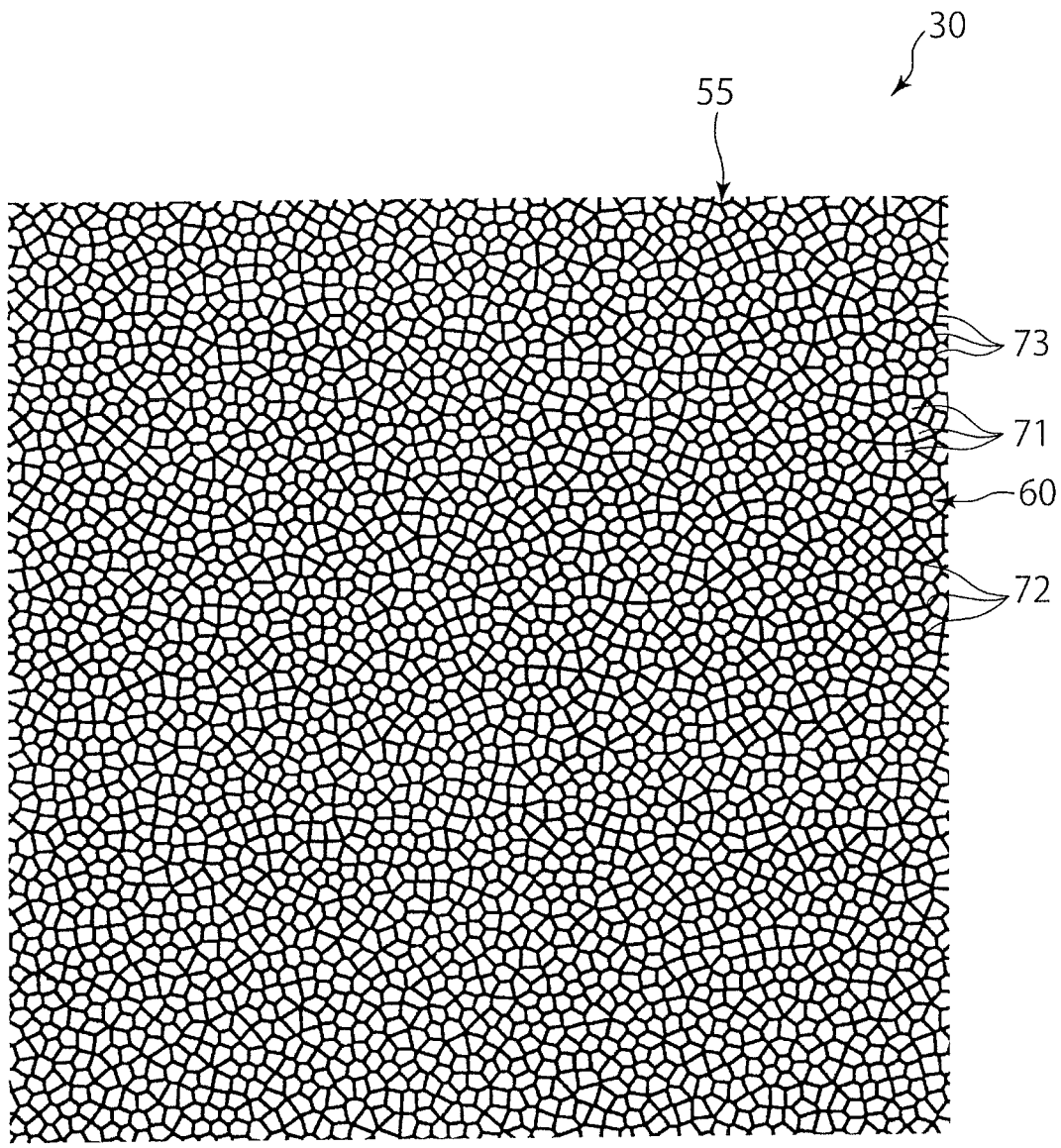
FIG. 7 is a plan view showing another example of the conductive mesh shown in FIG. 5.

In the conductive meshes 55 shown in FIGS. 5 and 7, the average of the number of boundary segments 73 extending from each branch point 72 is not less than 3.0 and less than 4.0. By making the average of the number of boundary segments 73 extending from each branch point 72 not less than 3.0 and less than 4.0, the arrangement pattern of each conductive mesh 55 can be made significantly different from a square lattice pattern. By making the average of the number of boundary segments 73 extending from each branch point 72 more than 3.0 and less than 4.0, each conductive mesh 55 can be made to have a honeycomb arrangement pattern with reduced regularity. Further, it has been found in the present inventors' studies that by making the average of the number of boundary segments 73 extending from each branch point 72 not less than 3.0 and less than 4.0, the arrangement of the open areas 71 can be made irregular so that there stably exists no direction in which open areas 71 are arranged with repetition regularity (periodicity), thereby making it possible to very effectively obscure moire.

Furthermore, the occurrence of a noticeable dark/light pattern can be prevented by imposing the above-described restriction on the average of the number of boundary segments 73 extending from each branch point 72. Though the reason why a dark/light pattern can be prevented has not yet been fully elucidated, it may be due to the fact that the in-plane dispersion of the open areas 71 becomes uniform to some extent by imposing the above-described restriction on the average of the number of boundary segments 73 extending from each branch point 72.

The average of the number of boundary segments 73 extending from each branch point 72 should strictly be determined by determining the number of boundary segments 73 extending from all the branch points 72 contained in the conductive mesh 55, and then calculating the average value. In practice, however, it is possible to use a method comprising: selecting a region having an area which is expected to be capable of reflecting the overall trend of the number of boundary segments 73 extending from each branch point 72, taking into consideration the size of each open area 71 defined by thin conductive wires 60, etc.; determining the number of boundary segments 73 extending from all the branch points 72 contained in the region; and calculating the average value. The calculated value is treated as the average of the number of boundary segments 73 extending from each branch point 72, determined for the entire conductive mesh 55. For example, in the conductive meshes 55 formed in the active area Aa1 of the touch panel sensor 30, each open area 71 has an opening area which is equal to the area of a circle having a diameter of 100 µm to 600 µm. In the case of the conductive meshes 55 of the touch panel sensor 30 having the open areas 71 of such dimensions, a 30 mm×30 mm region may be selected in a conductive mesh 55, and the average of the number of boundary segments 73 extending from each branch point 72, calculated for the branch points 72 contained in the region, may be treated as the average value determined for the entire conductive mesh 55.

Likewise, whether there exists a direction in which open areas 71 are arranged at a constant pitch should strictly be determined for all the open areas 71 that exist in any direction in the entire area of a target conductive mesh 55. In practice, however, it is possible to use the following method: A region having an area which is expected to be capable of reflecting the overall trend of the arrangement of the open areas 71 (e.g. a 30 mm×30 mm region in the case of a conductive mesh 55 in which the open areas 71 having the above-described dimensions are formed) is selected. In the selected region, the arrangement of open areas 71 is checked in those directions which pass through a central point in the region and which are equally spaced apart at an angle which is expected to be capable of reflecting the trend of periodicity in all directions (e.g. at an angle of 15° in the case of a conductive mesh 55 in which the open areas 71 having the above-described dimensions are formed) to determine whether there exists a direction in which open areas 71 are regularly arranged.

In the conductive mesh 55 of the touch panel sensor 30, shown in FIG. 5, the average of the number of boundary segments 73 extending from each branch point 72 is more than 3.0 and less than 4.0. More specifically, of 387 target branch points 72, 3 boundary segments 73 extend from each of 373 branch points 72, and 4 boundary segments 73 extend from each of the other 14 branch points 72. Thus, the average number of boundary segments (average number of branches) extending from each branch point 72 is 3.04. When the conductive mesh 55 shown in FIG. 5 was actually produced and disposed on the pixel array of a commercially-available liquid crystal display device, a visible stripe pattern moire (interference pattern) and a visible dark/light pattern were not observed.

Further, the present inventors' studies of various patterns of the conductive mesh 55 have revealed that a visible dark/light pattern and moire both can be more obscured if at least one of the following conditions (A), (B) and (C) is met:

Condition (A): Those open areas 71 which are surrounded by 6 boundary segments 73 are contained most in the conductive mesh 55. That is, those open areas 71 which are surrounded by 6 boundary segments 73 are contained in a larger number in the conductive mesh 55 as compared to those open areas 71 which are surrounded by any other number of boundary segments 73.

Condition (B): The following condition (b1) is met. Preferably, the following condition (b1) and one of the following conditions (b2) and (b3) are met. More preferably, all of the following conditions (b1), (b2) and (b3) are met:

(b1) At least two of an open area(s) 71 surrounded by 5 boundary segments 73, an open area(s) 71 surrounded by 6 boundary segments 73 and an open area(s) 71 surrounded by 7 boundary segments 73 are each contained plurally in the conductive mesh 55.

(b2) A plurality of those open areas 71 which are surrounded by 5, 6 or 7 boundary segments 73 are not equal in at least one of the area and the shape. Thus, in the case where a plurality of those open areas 71 which are surrounded by 5 boundary segments 73 are contained in the conductive mesh 55, at least two of the open areas 71 defined by 5 boundary segments 73 differ from each other in at least one of the area and the shape. In the case where a plurality of those open areas 71 which are surrounded by 6 boundary segments 73 are contained in the conductive mesh 55, at least two of the open areas 71 defined by 6 boundary segments 73 differ from each other in at least one of the area and the shape. In the case where a plurality of those open areas 71 which are surrounded by 7 boundary segments 73 are contained in the conductive mesh 55, at least two of the open areas 71 defined by 7 boundary segments 73 differ from each other in at least one of the area and the shape.

(b3) A plurality of those open areas 71 which are surrounded by 6 boundary segments 73 are contained in the conductive mesh 55.

Condition (C): The number $N_k$ of those open areas 71 which are surrounded by k boundary segments 73 satisfy the following relations: $N_k \leq N_{k+1}$ when k is an integer that satisfies $3 \leq k \leq 5$; and $N_k \geq N_{k+1}$ when k is an integer that satisfies $6 \leq k$ Thus, those open areas 71 which are surrounded by 6 boundary segments 73 are contained most in the conductive mesh 55. The number of open areas 71 decreases as the number of boundary segments 73 that surround each of the open areas 71 increases from 6, and also as the number of boundary segments 73 that surround each of the open areas 71 decreases from 6.

In a strict sense, whether the conditions (A) to (C) are met or not should be determined for all the open areas 71 contained in the conductive mesh 55. In practice, however, it is possible to use the following method: A region having an area which is expected to be capable of reflecting the overall trend of the number of boundary segments 73 surrounding each open area 71 (e.g. a 30 mm×30 mm region in the case of a conductive mesh 55 in which the open areas 71 having the above-described dimensions are formed) is selected taking into consideration the size of each open area 71 defined by thin conductive wires 60, etc. In the selected region, the number of boundary segments 73 surrounding each open area 71 is determined to determine whether the conditions (A) to (C) are met.

The technical effects achieved by the conductive meshes 55 which meet at least one of the conditions (A) to (C) are considered to be remarkable and unexpected ones in view of the technical level of the prior art in which merely making the mesh pattern irregular has been practiced in order to prevent moire. Though the reason why such technical effects are achieved by the conductive meshes 55 which meet at least one of the conditions (A) to (C) has not yet been fully elucidated, the following can be considered a cause. However, the present invention is not bound by the theory.

When each conductive mesh 55 meets at least one of the conditions (A) to (C), the arrangement of the open areas 71 can be one which corresponds to a honeycomb arrangement comprising regularly-arranged regular hexagons having the same shape, but in which regularity of the shape and the arrangement of the open areas is reduced, in other words, a honeycomb arrangement which is randomized in the shape and the arrangement of the open areas. It is considered that this can prevent an appreciable variation in the density of the open areas 71, making it possible to distribute a large number of open areas 71 approximately at a uniform density, i.e. approximately uniformly. Accordingly, the arrangement of the open areas 71 can be stably made completely irregular, i.e. the arrangement of the open areas 71 can be stably made irregular such that there exists no direction in which open areas 71 are regularly arranged. Therefore, compared to the case of merely making the arrangement of the open areas irregular, both a visible dark/light pattern and moire can be effectively obscured.

Figure 8:
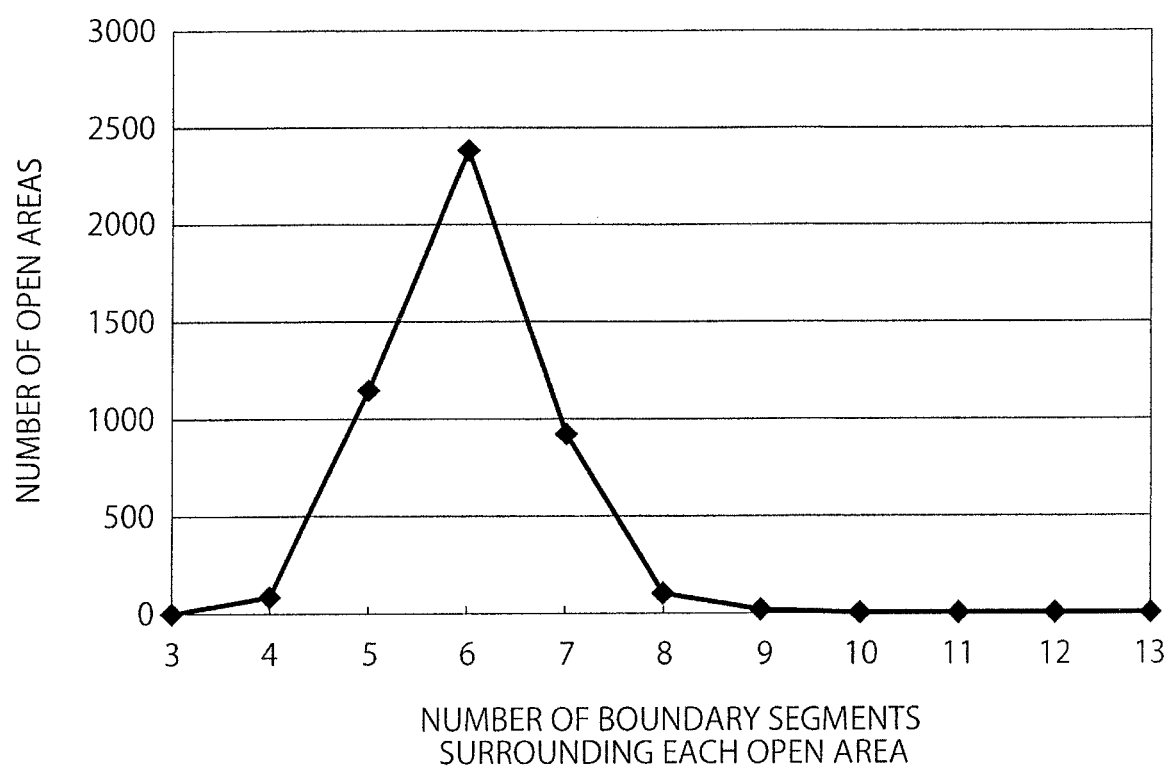
FIG. 8 is a graph showing the number of open areas surrounded by a varying number of boundary segments in the conductive mesh of FIG. 7.

The applicants conducted an experiment to examine a conductive mesh 55 having the pattern shown in FIG. 7. As a result, as shown in FIG. 8, the conductive mesh 55 was found to contain 79, 1141, 2382, 927, 94 and 8 open areas 71 which are each surrounded by 4, 5, 6, 7, 8 and 9 boundary segments 73, respectively. It was also found that the conductive mesh 55 contains no open areas 71 which are each surrounded by 3 boundary segments 73 and no open areas 71 which are each surrounded by 10 or more boundary segments 73. Thus, the conductive mesh 55 shown in FIG. 7 meets all the conditions (A), (B) and (C). Furthermore, it was found that in the conductive mesh 55 shown in FIG. 7, there exists no direction in which open areas 71 are arranged at a constant pitch and, in addition, the average of the number of boundary segments 73 extending from each branch point 72 is not less than 3.0 and less than 4.0. When the boundary segments 73 are straight line segments, an open area 71 surrounded by N boundary segments 73 has an N-sided polygonal shape. When the conductive mesh 55 shown in FIG. 7 was actually produced and disposed on the pixel array of the image display mechanism 12, a visible stripe pattern moire (interference pattern) and a visible dark/light pattern were not observed.

The following is a description of an exemplary method for producing a conductive mesh pattern in which the average of the number of boundary segments 73 extending from each branch point 72 is more than 3.0 and less than 4.0 and, in addition, there exists no direction in which open areas 71 are arranged at a constant pitch.

The method comprises the steps of: determining base points; preparing a Voronoi diagram from the determined base points; determining a pathway for a boundary segment extending between two Voronoi points connected by a Voronoi boundary in the Voronoi diagram; and determining the thickness of the determined pathway to define the boundary segment, thereby determining a mesh pattern of a conductive mesh 55 (thin conductive wires 60). The respective steps will now be described in order. The above-described mesh pattern of the conductive mesh 55 shown in FIG. 5 was actually determined by the below-described method. The mesh pattern of the conductive mesh 55 shown in FIG. 7 can also be determined by the below-described method.

Figure 9:
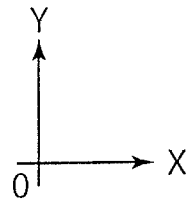
FIG. 9 is a diagram illustrating a method for designing the mesh pattern of the conductive mesh shown in FIG. 5, the method being to determine base points.
Figure 9:
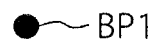
Figure 10:
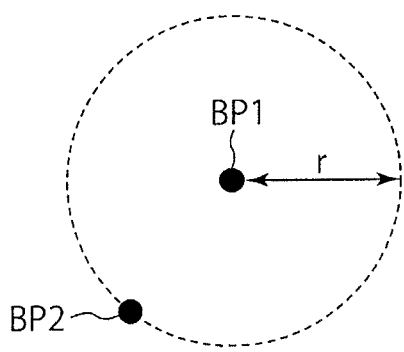
FIG. 10 is a diagram illustrating a method for designing the mesh pattern of the conductive mesh shown in FIG. 5, the method being to determine base points.
Figure 11:
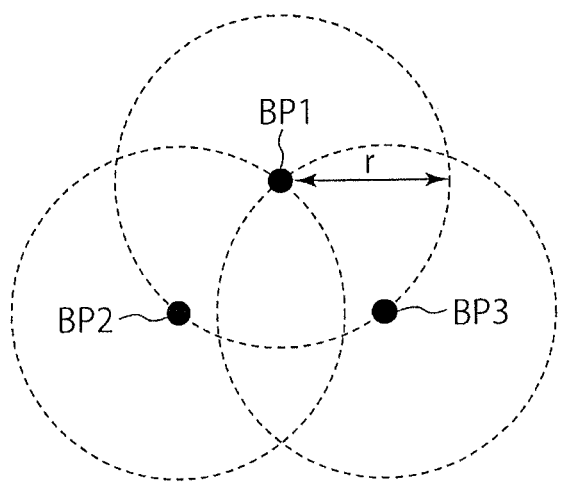
FIG. 11 is a diagram illustrating a method for designing the mesh pattern of the conductive mesh shown in FIG. 5, the method being to determine base points.

The step of determining base points will be described first. At the outset, as shown in FIG. 9, a first base point BP1 is plotted at an arbitrary position on an absolute coordinate system O-X-Y. Next, as shown in FIG. 10, a second base point BP2 is plotted at an arbitrary position at a distance r from the first base point BP1. In other words, a second base point BP2 is plotted at an arbitrary position on a circle with a radius r (hereinafter referred to as "first circle"), centered at the first base point BP1 and lying on the absolute coordinate system O-X-Y. Next, as shown in FIG. 11, a third base point BP3 is plotted at an arbitrary position at a distance r from the first base point BP1 and at a distance of not less than r from the second base point BP2. Thereafter, a fourth base point BP4 is plotted at an arbitrary position at a distance r from the first base point BP1 and at a distance of not less than r from the other base points BP2, BP3.

In this manner, base points are plotted at an arbitrary position at a distance r from the first base point BP1 and at a distance of not less than r from the other base points until the next base point cannot be plotted any more. Thereafter, the same operation is performed with reference to the second base point BP2. Thus, the next point is plotted at an arbitrary position at a distance r from the second base point BP2 and at a distance of not less than r from the other base points. In this manner, base points are plotted at an arbitrary position at a distance r from the second base point BP2 and at a distance of not less than r from the other base points until the next base point cannot be plotted any more. Thereafter, base points are produced successively by the same procedure while changing reference base points in order.

Base points are plotted successively by the above procedure until a base point cannot be plotted any more in an area in which a conductive mesh 55 is to be formed. The step of producing base points is completed when a base point cannot be plotted any more in the area in which the conductive mesh 55 is to be formed. When the above process is complete, base points which are irregularly plotted on the two-dimensional plane (XY plane) are uniformly dispersed in the area in which the conductive mesh 55 is to be formed.

With regard to the base points BP1, BP2, . . . BP6 (see FIG. 12(A)) thus produced and distributed in the two-dimensional plane (XY plane), the distances between adjacent base points are not constant but have a distribution. The distribution of the distances between any two adjacent base points is not a completely random distribution (uniform distribution): the distances are distributed in the range AR between the upper limit $R_{MAX}$ and the lower limit $R_{MIN}$ ($\Delta R = R_{MAX} - R_{MIN}$), with the average $R_{AVE}$ lying in the range. The "two adjacent base points" are herein defined as follows: if, after preparing the below-described Voronoi diagram from the base points BP1, BP2, . . . , two Voronoi regions XA lie adjacent to each other, then the base points of the two Voronoi regions XA are defined as two adjacent base points.

Figure 12A:
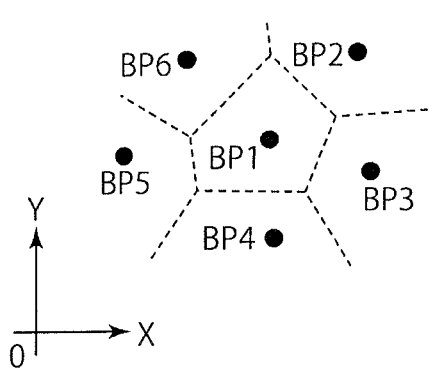
FIGS. 12(a) through 12(d) are diagrams showing the determined base points in an absolute coordinate system or in a relative coordinate system, illustrating the degree of dispersion of the base points.
Figure 12B:
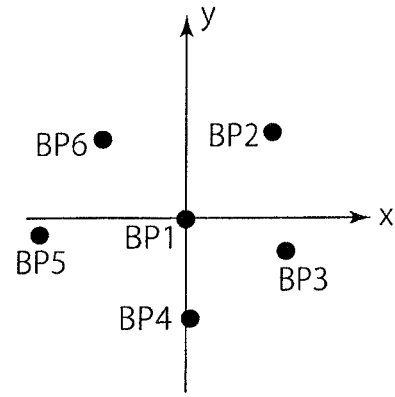
Figure 12C:
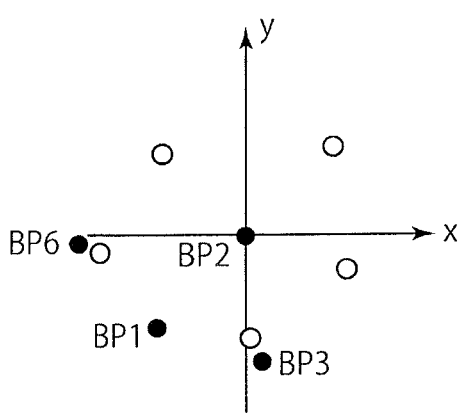
Figure 12D:
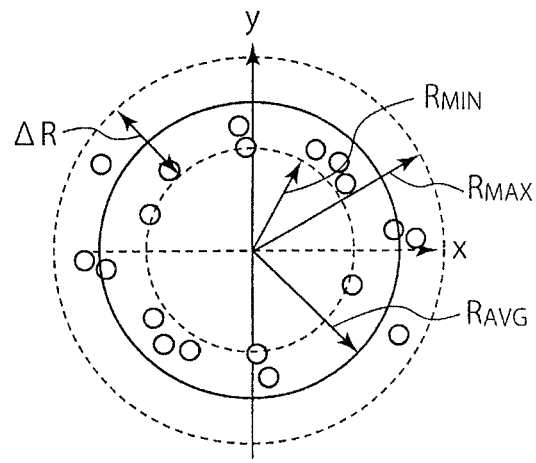

In particular, on a coordinate system in which each of the above base points is taken as the origin (such a coordinate system is referred to as a relative coordinate system o-x-y, while a coordinate system that defines the real two-dimensional plane is referred to as an absolute coordinate system O-X-Y), all the base points lying adjacent to the base point as the origin are plotted to obtain a graph such as one shown in FIG. 12(B). Such graphs of FIG. 12(B), FIG. 12(C), . . . are obtained by using all the above base points as the origin. All the thus-obtained graphs of adjacent base points on the respective relative coordinate systems are then overlapped to obtain a graph as shown in FIG. 12(D). The distribution pattern of adjacent base points on the relative coordinate system, shown in the resulting graph, indicates that the distances between any two adjacent base points are not uniformly distributed in the range from 0 to infinity, but distributed in the finite range from $R_{AVE} - \Delta R$ to $R_{AVE} + \Delta R$ (in the toroidal area with the radius ranging from $R_{MIN}$ to $R_{MAX}$). In FIG. 12(A), Voronoi boundaries (see FIG. 13) obtained from the base points are shown by broken lines for reference.

By setting the distances between base points in the above-described manner, the dimensions of Voronoi regions XA obtained from the base points by the below-described method, and also the dimensions of open areas 71 obtained from the Voronoi regions can be made to be distributed not uniformly (completely randomly) but in a finite range.

A size of open area 71 can be adjusted by changing the distance r in the above-described step of determining base points. In particular, a size of open area 71 can be decreased by decreasing the distance r. Conversely, a size of open area 71 can be increased by increasing the distance r.

Figure 13:
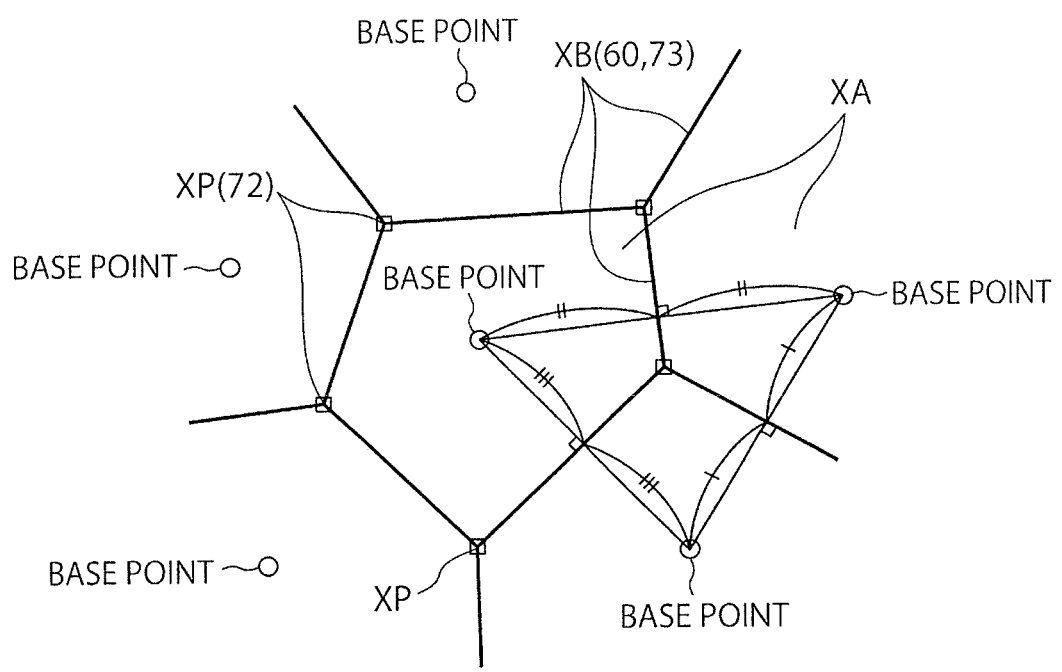
FIG. 13 is a diagram illustrating a method for designing the mesh pattern of the conductive mesh shown in FIG. 5, the method being to prepare a Voronoi diagram from the determined base points and determine the mesh pattern.

Next, as shown in FIG. 13, a Voronoi diagram is prepared based on the plotted base points. As shown in FIG. 13, a Voronoi diagram is composed of line segments connected at points of intersection between perpendicular bisectors which are each drawn between two adjacent base points. The line segments of the perpendicular bisectors are herein referred to as Voronoi boundaries XB; the points of intersection between Voronoi boundaries XB, which form the end points of Voronoi boundaries XB, are herein referred to as Voronoi points XP; and the regions surrounded by Voronoi boundaries XB are herein referred to as Voronoi regions XA.

In the Voronoi diagram shown in FIG. 13, the Voronoi points XP are used as the branch points 72 of the conductive mesh 55. One boundary segment 73 is provided between two Voronoi points XP that form the end points of one Voronoi boundary XB. As in the embodiment illustrated in FIG. 5, such a boundary segment 73 may be designed as a straight line extending linearly between two Voronoi points XP. Alternatively, such a boundary segment 73 may be designed to extend between two Voronoi points XP in a variety of pathways (for example, a curved line such as a circular arc, an elliptical arc, a parabola, a hyperbola, a sine curve, a hyperbolic sine curve, an elliptic function curve or a Bessel function curve, a polygonal line, etc.) without contact with other boundary segment 73. When the boundary segments 73 are designed to each extend linearly between two Voronoi points XP, the boundary segments 73 coincide with the Voronoi boundaries XB.

After determining the pathways of the boundary segments 73, the line width (thickness) of the boundary segments 73 is determined. For the reasons described below, the line width of the boundary segments 73 is preferably made 0.2 μm to 2 μm so that the conductive mesh 55 can have the desired visible light transmittance and surface resistivity. The pattern of the conductive mesh 55 can be determined in the manner described hereinabove.

(Extraction Electrodes 45)

The extraction electrodes 45 will now be described. As described above, the electrodes 40 include the extraction electrodes 45 connected to the above-described detection electrodes 50. Depending on the method employed to detect a contact position, one or two extraction electrodes 45 are provided for each detection electrode 50. Each extraction electrode 45 comprises an extraction wire 46 connected to the connecting wire 51 of the corresponding detection electrode 50 or to the thin conductive wires 60 of the conductive mesh 55 of the corresponding detection electrode 50. Each extraction electrode 45, in at least a part thereof in the thickness direction, is formed of the same material as and formed integrally with the corresponding detection electrode 50, as will be described below. Each extraction electrode 45 extends, in the non-active area Aa2 of the substrate 35, from the corresponding detection electrode 50 to the peripheral edge of the substrate 35. Each extraction electrode 45, at its end, is connected to the detection control section 21 via a not-shown external connecting wire (e.g. FPC).

(Cross-Sectional Shape of Electrode 40)

The cross-sectional shape of each electrode 40 will now be described. FIG. 4 shows the touch panel sensor 30 in a cross-section along the thickness direction. The "cross-section along the thickness direction" herein refers to a cross-section along the normal direction to the sheet plane (film plane, plate plane, panel plane) of the sheet-shaped (film-shaped, plate-shaped, panel-shaped) touch panel sensor 30. The term "sheet plane (film plane, plate plane, panel plane)" herein refers to a plane which coincides with the planar direction of an objective sheet-shaped (film-shaped, plate-shaped, panel-shaped) member when taking a wide and global view of the member. In this embodiment the substrate 35 has a sheet-like shape with the pair of main surfaces. Thus, in this embodiment, the "cross-section along the thickness direction" coincides with a cross-section along the normal direction to the surfaces of the substrate 35.

FIG. 4 shows the cross-sectional shape of each thin conductive wire 60 of a conductive mesh 55. Each connecting wire 51 of the detection electrode 50 has the same cross-sectional shape as each thin conductive wire 60 except that they differ only in the width. Thus, as shown in FIG. 4, the thin conductive wires 60 and the connecting wires 51, constituting the detection electrode 50, each have a base surface 66 on the substrate 35 side, a flat top surface 67 located opposite to the base surface 66, and a pair of side surfaces 68 extending between the base surface 66 and the top surface 67. In the embodiment illustrated in FIG. 4, the base surface 66 and the top surface 67 are parallel to each other. Further, in the embodiment illustrated in FIG. 4, each thin conductive wire 60 and each connecting wire 51 comprise a metal layer 61 located on the substrate 35 side and having the base surface 66, and a blackened layer 62 provided on the metal layer 61 and having the top surface 67. The metal layer 61 is formed integrally between the connecting wire 51 and the thin conductive wires 60 of the conductive meshes 55, and the blackened layer 62 is formed integrally between the connecting wire 51 and the thin conductive wires 60 of the conductive meshes 55.

The metal layer 61 is formed of a metal material having a high electrical conductivity, such as copper, aluminum, iron, silver, or an alloy thereof. The metal layer 61 has a relatively high reflectance. When external light is reflected from the metal layer 61 constituting the detection electrodes 50 of the touch panel sensor 30, the contrast of an image on the image display mechanism 12 as viewed through the active area Aa1 of the touch panel device 20 becomes lower. In view of this, the blackened layer 62 is disposed on the viewer side of the metal layer 61. The blackened layer 62 can enhance image contrast, thereby improving the visibility of images displayed by the image display mechanism 12.

Any of a variety of known layers can be used as the blackened layer 62. The blackened layer 62, composed of a metal oxide or a metal sulfide, may be formed in a part of the metal layer 61 by subjecting the part to blackening treatment. Alternatively, the blackened layer 62, such as a coating film of a black material or a plating layer of nickel, chromium, or the like, may be formed on the metal layer 61. For example, when the metal layer 61 is made of iron, the metal layer 61 may be exposed to a steam atmosphere at about 450 to 470° C. for 10 to 20 minutes to form an oxide film (blackened film) having a thickness of about 1 to 2 μm in the surface of the metal layer 61. Alternatively, the metal layer 61 made of iron may be treated with a chemical, such as concentrated nitric acid, to form an oxide film (blackened film) in the surface of the metal layer 61. When the metal layer 61 is made of copper, the metal layer 61 is preferably subjected to cathodic electrodeposition in an electrolytic solution, e.g. comprising sulfuric acid, copper sulfate and cobalt sulfate, to deposit cationic particles onto the metal layer 61. The deposition of cationic particles can roughen the metal layer 61 and, at the same time, can achieve blackening of the layer. The cationic particles may be copper particles or particles of an alloy of copper and other metal(s), preferably particles of a copper-cobalt alloy. From the viewpoint of black density, the cationic particles preferably have an average particle size of about 0.1 to 1 μm. The blackened layer 62 herein includes not only a blackened layer but also a roughened layer.

The extraction wire 46 of each extraction electrode 45 may have the same cross-sectional shape as that of the thin conductive wire 60 or the connecting wire 51 of each detection electrode 50, shown in FIG. 4. Thus, the extraction wire 46 of each extraction electrode 45 has a base surface 66 on the substrate 35 side, a flat top surface 67 located opposite to the base surface 66, and a pair of side surfaces 68 extending between the base surface 66 and the top surface 67. The base surface 66 and the top surface 67 of the extraction wire 46 may be parallel to each other as shown in FIG. 4. The extraction wire 46 of each extraction electrode 45 includes a metal layer 61 in a cross-section in the thickness direction. The metal layer 61 of each extraction electrode 45 is formed integrally with the metal layer 61 of the corresponding detection electrode 50. Thus, the electrode 40, in any cross-section thereof in the thickness direction, includes the metal layer 61 which occupies at least part of the cross-section.

On the other hand, the extraction electrodes 45 are disposed in the non-active area Aa2 that faces the non-display area A2 of the image display mechanism 12. Therefore, the extraction wires 46 of the extraction electrodes 45 need not have the blackened layer 62. However, in order to avoid cumbersome patterning of the blackened layer 62, the extraction wires 46 of the extraction electrodes 45 may have the blackened layer 62 as with the detection electrodes 50. In that case, the blackened layer 62 of each extraction electrode 45 may be formed integrally with the blackened layer 62 of the corresponding detection electrode 50.

In the illustrated embodiment the electrodes 40 each consist of the metal layer 61 and the blackened layer 62; however, instead of or in addition to the blackened layer 62, some other layer(s) may be laminated to the metal layer 61. The some other layer is, for example, an anti-rust layer.

In the electrodes 40 having the above construction, the width (maximum width) W of each thin conductive wire 60 constituting a conductive mesh 55, shown in FIG. 4, i.e. the width (maximum width) W along the sheet plane of the sheet-shaped touch panel sensor 30, is preferably made not less than 1 μm and not more than 5 μm, and the height (thickness) H of each thin conductive wire 60 constituting a conductive mesh 55, shown in FIG. 4, i.e. the height (thickness) H in the normal direction to the sheet plane of the sheet-shaped touch panel sensor 30, is preferably made not less than 0.2 μm and not more than 2 μm. The conductive meshes 55 having such dimensions, because of the thin conductive wires 60 which are made sufficiently thinned, can very effectively make the electrodes 40 invisible. Furthermore, because of the sufficient height of the top surface 67 from the base surface 66, which surfaces are parallel to each other in the cross-sectional shape of each thin conductive wire 60, i.e. because of the sufficiently high aspect ratio (H/W) of the cross-sectional shape of each thin conductive wire 60, the thin conductive wires 60 can have a high electrical conductivity. The surface resistivity of the conductive meshes 55 can therefore be made not more than 50Ω/□, preferably not more than 20 Ω/□.

Thus, according to the thin conductive wires 60 having such cross-sectional dimensions, the thin conductive wires 60, constituting the electrodes 40 of the touch panel sensor 30, can be thinned while maintaining the electrodes 40 at a low resistance. The thinned thin conductive wires 60, even in combination with high-definition pixels or with short-pitch pixels provided in a portable terminal, called a tablet, can achieve a high detection accuracy while sufficiently making the detection electrodes 50 invisible.

From the viewpoint of making the electrodes 40 invisible, the width W along the sheet plane of the sheet-shaped touch panel sensor 30 is preferably not more than 5.0 μm, more preferably not more than 3.5 μm and, from the viewpoint of reducing the surface resistivity, is preferably not less than 1 μm, more preferably not less than 2 μm. From the viewpoint of stabilizing the accuracy of the production of the electrodes 40, the height (thickness) H in the normal direction to the sheet plane of the sheet-shaped touch panel sensor 30 is preferably not more than 2.0 μm, more preferably not more than 1.5 μm and, from the viewpoint of reducing the surface resistivity, is preferably not less than 0.1 μm, more preferably not less than 0.5 μm. In addition, from the viewpoint of ensuring the technical effects described above, the aspect ratio (H/W) of the cross-sectional shape of each thin conductive wire 60 is preferably not less than 0.04 and not more than 2.00, more preferably not less than 0.67 and not more than 7.00.

The cross-sectional shape of each thin conductive wire 60, shown in FIG. 4, is tapered: the width $W_2$ at the top surface 67 is narrower than the width $W_1$ at the base surface 66. Particularly in the illustrate embodiment, the width of each thin conductive wire 60 changes such that it solely decreases in a direction from the base surface 66 toward the top surface 67, in other words, in a direction toward the viewer. In particular, in the illustrate embodiment, the width of each thin conductive wire 60 continuously decreases in a direction from the base surface 66 toward the top surface 67, in other words, in a direction toward the viewer. When the touch panel sensor 30 is incorporated into the display device 10 and the touch panel device 20 such that the top surface 67 faces the viewer as shown in FIG. 2, the contrast of an image displayed by the image display mechanism 12 can sometimes become low due to reflection of external light from the metal layer 61 exposed on the side surfaces 68. In view of this, the difference between the width $W_1$ at the base surface 66 and the width $W_2$ at the top surface 67 ($W_1-W_2$) is preferably not more than 1.0 µm, more preferably not more than 0.5 µm.

When the thin conductive wires 60 are produced by patterning using a photolithography technique as will be described below, erosion by etching progresses not only in the depth direction (thickness direction) but in the lateral direction (planar direction) as well. The thin conductive wires 60 can be made to have a tapered cross-sectional shape as shown in FIG. 4 by utilizing the side etching phenomenon.

On the other hand, according to the below-described method for the production of the touch panel sensor 30, the height of the connecting wires 51 of the detection electrodes 50 and the height of the extraction wires 46 of the extraction electrodes 45 are equal to the height of the thin conductive wires 60 constituting the conductive meshes 55 of the detection electrodes 50. In that case, the width of each of the connecting wires 51 of the detection electrodes 50 can be made not less than 5.0 µm, and the width of each of the extraction wires 46 of the extraction electrodes 45 can be made not less than 5.0 µm.

(Method for Producing Touch Panel Sensor 30)

An exemplary method for producing the above-described touch panel sensor 30 will now be described mainly with reference to FIG. 14.

Figure 14A:
FIGS. 14(a) through 14(e) are diagrams illustrating an exemplary method for producing a touch panel sensor.

First, a substrate 35 is prepared as shown in FIG. 14(a). As described above, a glass or resin film can be used as the substrate 35. When a resin film having optical anisotropy is used as the substrate 35, the retardation Re of the resin film is preferably adjusted to the above-described value in order to obscure a rainbow pattern.

Figure 14B:
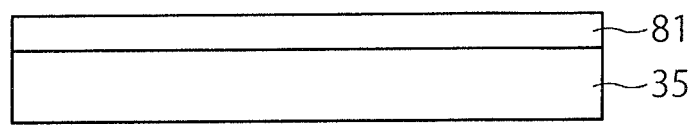

Next, as shown in FIG. 14(b), a metal film 81, which is to make the metal layer 61 of each electrode 40, is formed on the substrate 35. The metal film 81 is not formed by laminating a metal foil, such as a copper foil, onto the substrate 35 via an adhesive layer, but formed directly on the substrate 35 without an adhesive layer. Thus, the metal film 81 is formed not by laminating an available metal foil having a certain thickness onto the substrate 35, but by depositing a film to a certain thickness on the substrate 35. Any of various film-forming (film-depositing) methods, such as sputtering, vapor deposition, electroplating, electroless plating, etc. can be used to form the metal film 81.

Vapor deposition is preferably employed to form the metal film 81 with a thickness of 0.2 to 2 µm in order to adjust the height (thickness) H of each electrode 40 to 0.2 to 2 µm as described above. The use of a vapor deposition method can produce the metal film 81 having a thickness of 0.2 to 2 µm, in particular not less than 0.5 µm, at a low cost in a relatively short time. The metal film 81 can also be effectively formed by a multi-step process comprising a sputtering step and a later step(s) performed by other method (s) such as electroplating. A base layer having excellent adhesive properties can be formed by the sputtering step. The thickness of the metal layer 81 can be relatively quickly increased to a desired thickness by the later electroplating step.

Figure 14C:
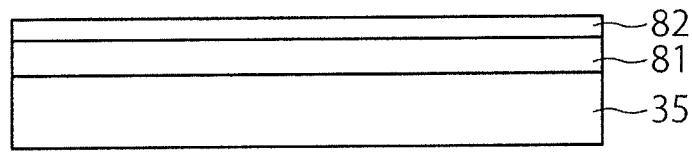
Figure 14D:
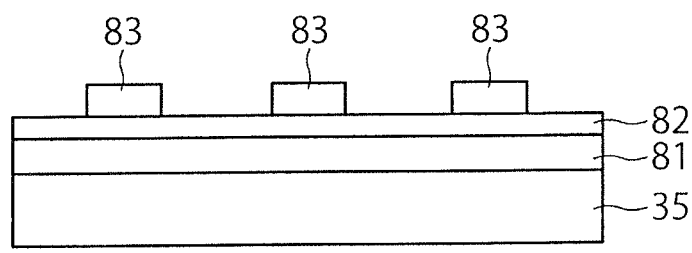
Figure 14E:
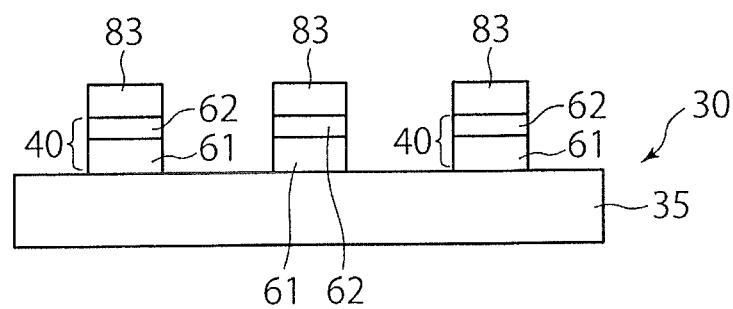

Thereafter, as shown in FIG. 14(c), a blackened film 82, which is to make the blackened layer 62 of each electrode 40, is formed on the metal film 81. As described previously, a surface portion of the metal film 81 may be subjected to blackening treatment to form the blackened film 82, composed of a metal oxide or a metal sulfide, in the surface portion of the metal film 81. It is also possible to provide the blackened film 82, such as a coating film of a black material or a plating layer of nickel, chromium, or the like, on the metal film 81.

Next, the metal film 81 and the blackened film 82 on the substrate 35 are subjected to patterning using a photolithography technique. More specifically, a resist film 83 is provided on the blackened film 82, and the resist film 83 is patterned by pattern exposure and development (FIG. 14(d)). Next, using the patterned resist film 83 as a mask, the blackened film 82 and the metal film 81 are etched to form a blackened layer 62 and a metal layer 61 from the blackened film 82 and the metal film 81, respectively. In this manner, electrodes 40 comprising the metal layer 61 and the blackened layer 62 are formed in a desired pattern on the substrate 35 (FIG. 14(e)).

Thereafter, the resist film 83 on the electrodes 40 is removed to obtain a touch panel sensor 30. The above production method can produce the detection electrodes 50, each consisting of the metal layer 61 and the blackened layer 62, and the extraction electrodes 45, each consisting of the metal layer 61 and the blackened layer 62, integrally by the same process, which is desirable in the light of production efficiency.

Figure 21:
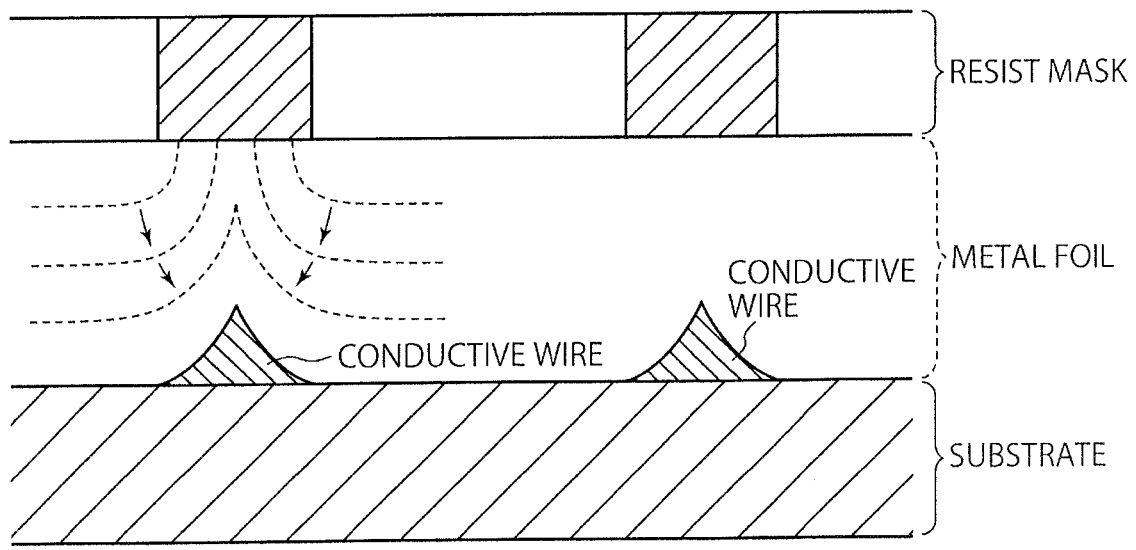
FIG. 21 is a diagram illustrating a problem in etching of a metal foil.

Further, according to the above production method, the total thickness of the metal film 81 and the blackened film 82 which are to be etched, can be made equal to the thickness of the electrodes 40 produced, e.g. not less than 0.2 µm and not more than 2 µm. By etching the metal film 81 and the blackened film 82 having such a total thickness, thin electrodes 40 having a line width of about 1 µm to 5 µm can be produced without causing significant side etching. Thus, the total thickness of the metal film 81 and the blackened film 82 is not too large for the line width of thin conductive wires 60 to be formed. Therefore, unlike the case of using a metal foil, described above with reference to FIG. 21, it is not likely that adjacent eroded portions connect with each other below the resist film 83. The thinned electrodes 40 (thin conductive wires 60) can therefore be produced stably with high accuracy. In addition, by setting the total thickness of the metal film 81 and the blackened film 82 at a value appropriate for the line width of thin conductive wires 60 to be formed, it becomes possible for the resulting thin conductive wires 60 to have a desired cross-sectional shape, e.g. a shape having a desired aspect ratio, in the thickness direction.

The above-described method for the production of the touch panel sensor 30 is merely an example, and is capable of various changes and modifications. For example, the blackened film 82 may be formed only in the active area Aa1. Alternatively, it is possible to provide an additional step to remove the blackened layer 62 produced in the non-active area Aa2, especially those portions of the blackened layer 62 which connect with an external wire such as FPC. It is also possible to use a method in which after forming the metal layer 61 of the electrodes 40 by patterning of the metal film 81, a blackened layer 62 is produced on the metal layer 61.

<<<Technical Effects>>>

In the above-described embodiment, the detection electrodes 50 include the conductive meshes 55 in which the thin conductive wires 60 are arranged in a mesh pattern that defines the large number of open areas 71. The height of the thin conductive wires 60 of the conductive meshes 55 may be not less than 0.2 µm and not more than 2 µm, and the width W of the thin conductive wires 60 may be not less than 1 µm and not more than 5 µm. The thin conductive wires 60 of the conductive meshes 55 each have a base surface 66 on the substrate 35 side, a flat top surface 67 located opposite to the base surface 66, and a pair of side surfaces 68 extending between the base surface 66 and the top surface 67. According to the thin conductive wires 60 having such cross-sectional dimensions and shape, the thin conductive wires 60, constituting the electrodes 40 of the touch panel sensor 30, can be thinned while maintaining the electrodes 40 at a low resistance. The thinned thin conductive wires 60, even in combination with high-definition pixels or with short-pitch pixels provided in a portable terminal, called a tablet, can achieve a high detection accuracy while sufficiently making the detection electrodes 50 invisible.

In the above-described embodiment, the substrate 35 preferably has in-plane birefringence with a retardation Re of not less than 6000 nm. The use of such a substrate 35 can effectively obscure a rainbow pattern even when image light from the image display mechanism 12 is a particular polarization component.

In the above-described embodiment, the thin conductive wires 60 constituting each conductive mesh 55 are composed of the large number of boundary segments 73 each extending between two branch points 72 and which define the open areas 71, the average of the number of boundary segments 73 extending from each branch point 72 is not less than 3.0 and less than 4.0 and, in addition, there exists no direction in which open areas 71 are arranged at a constant pitch, i.e. at a constant repeating pitch. The use of such conductive meshes 55 can effectively obscure moire which can be produced when the touch panel sensor 30 having the conductive meshes 55 is superimposed on the image display mechanism 12 in which pixels P are arranged regularly (periodically), or moire which can be produced when the touch panel sensor 30 is superimposed on another touch panel sensor 30 and, at the same time, can effectively obscure a dark/light pattern in the conductive meshes 55.

In the above-described embodiment, the thin conductive wires 60 constituting each conductive mesh 55 are composed of the large number of boundary segments 73 each extending between two branch points 72 and which define the open areas 71, and, of the open areas 71 contained in each conductive mesh 55, those open areas 71 which are surrounded by 6 boundary segments 73 are contained most. The use of such conductive meshes 55 can effectively obscure moire which can be produced when the touch panel sensor 30 having the conductive meshes 55 is superimposed on the image display mechanism 12 in which pixels P are arranged regularly (periodically), or moire which can be produced when the touch panel sensor 30 is superimposed on another touch panel sensor 30 and, at the same time, can effectively obscure a dark/light pattern in the conductive meshes 55.

<<<Variations>>>

Various changes and modifications may be made to the above-described embodiment. Some exemplary variations will now be described with reference to the relevant drawings. In the following description and relevant drawings, the same reference numerals are used for the same members or elements as used in the above-described embodiment, and a duplicate description thereof will be omitted.

As well shown in FIGS. 2 and 4, in the first touch panel sensor 31 and the second touch panel sensor 32 of the above-described embodiment, the electrodes 40 are formed on the viewer-side surface of the substrate 35. However, the electrodes 40 may be formed on the image display mechanism 12-side surface of the substrate 35 in at least one of the first touch panel sensor 31 and the second touch panel sensor 32.

Figure 15:
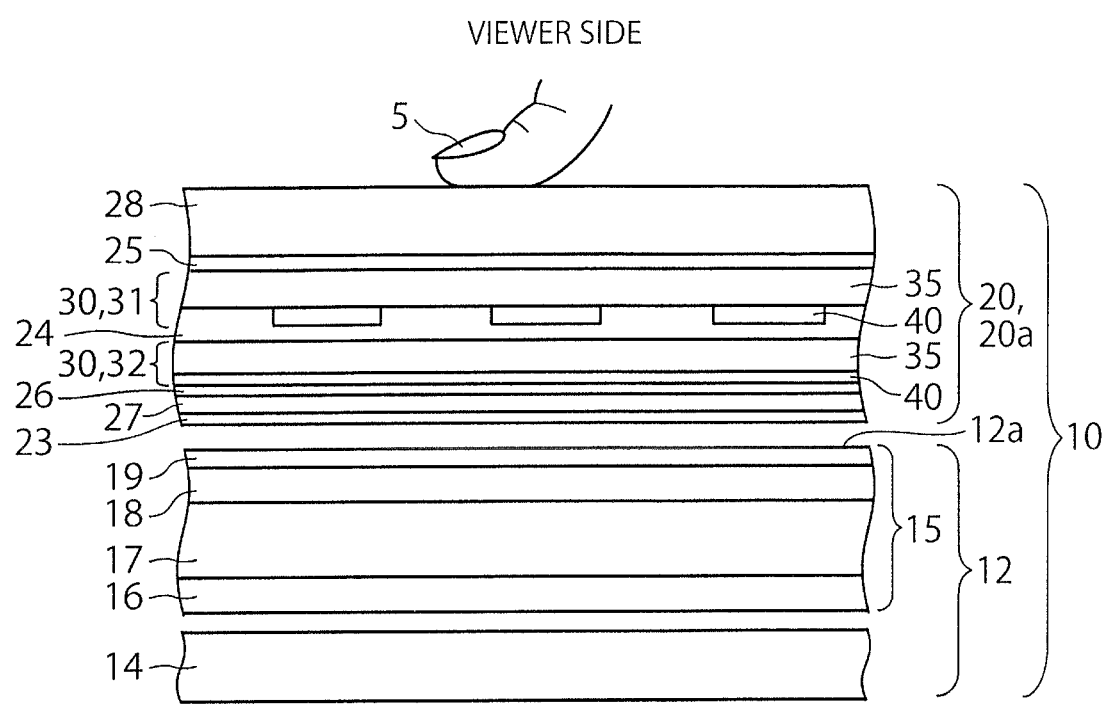
FIG. 15 is a diagram corresponding to FIG. 2, illustrating a variation of the touch panel device.

In the embodiment illustrated in FIG. 15, the electrodes 40 are provided on the image display mechanism 12-side surface of the substrate 35 in both of the first touch panel sensor 31 and the second touch panel sensor 32. In the embodiment illustrated in FIG. 15, the laminate 20a of the touch panel device 20 is composed of a cover layer 28, an adhesive layer 25, the first touch panel sensor 31, an adhesive layer 24, the second touch panel sensor 32, an adhesive layer 26, a support layer 27, and a low-refractive index layer 23, arranged in this order from the viewer side, i.e. from the opposite side from the image display mechanism 12.

Figure 16:
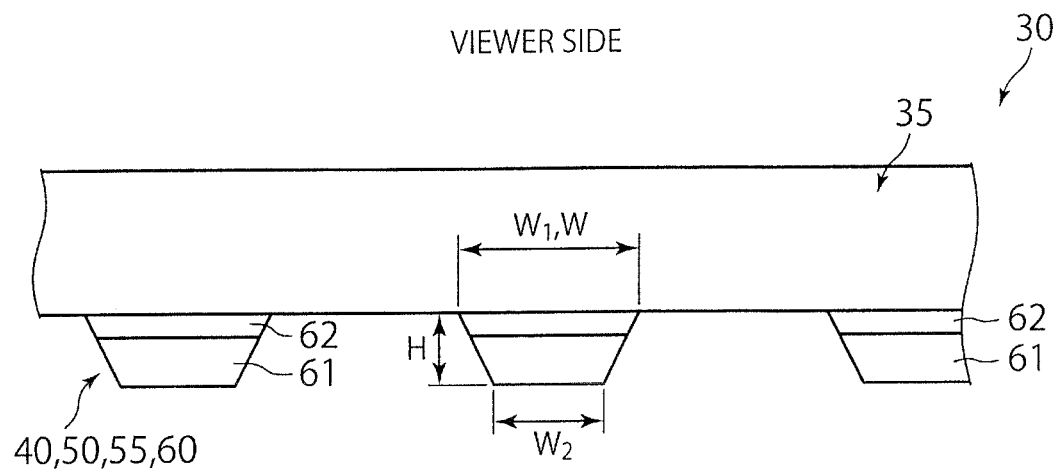
FIG. 16 is a diagram corresponding to FIG. 4, illustrating a variation of the touch panel sensor.

FIG. 16 shows an example of the touch panel sensor 30 which can be incorporated into the touch panel device 20 of FIG. 15. The touch panel sensor 30 shown in FIG. 16 comprises a substrate 35 and electrodes 40 provided on the substrate 35. The electrodes 40 each comprise a blackened layer 62 located on the substrate 35 side and having a base surface 66, and a metal layer 61 provided on the blackened layer 62 and having a top surface 67. Thus, also in the embodiment illustrated in FIG. 16, the blackened layer 62 is disposed on the viewer side of the metal layer 61 as in the above-described embodiment. The electrodes 40 shown in FIG. 16 differ from the electrodes 40 of the above-described embodiment in the order of lamination of the metal layer 61 and the blackened layer 62 onto the substrate 35, and can otherwise have the same construction as the electrodes 40 of the above-described embodiment. The blackened layer 62 and the metal layer 61, shown in FIG. 16, can be produced by the various methods described above. For example, the blackened layer 62 can be produced from a nickel or chromium film which has been formed by sputtering on the substrate 35. Alternatively, the blackened layer 62 can be produced from a coating, containing a dye or a pigment, applied to the substrate 35.

Figure 17:
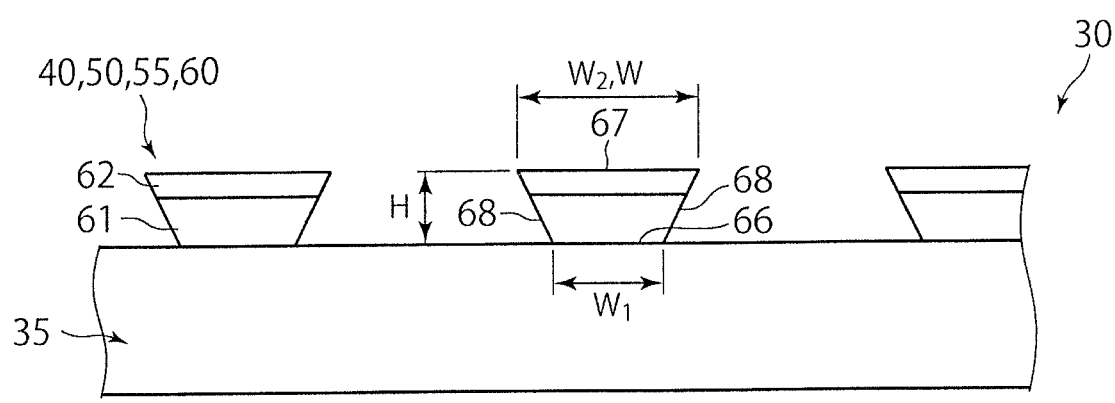
FIG. 17 is a diagram corresponding to FIG. 4, illustrating another variation of the touch panel sensor.

In the above-described embodiment, the shape of each electrode 40 in a cross-section along the thickness direction, in particular the shape of each thin conductive wire 60 of a conductive mesh 55 in a cross-section along the thickness direction, is tapered in a direction from the base surface 66 toward the top surface 67; however, the present invention is not limited to such a construction. For example, as shown in FIG. 17, the cross-sectional shape of each electrode 40, particularly the cross-sectional shape of each thin conductive wire 60 may be tapered such that the width $W_2$ at the top surface 67 is wider than the width $W_1$ at the base surface 66. Particularly in the embodiment illustrated in FIG. 17, the width of each thin conductive wire 60 changes such that it solely decreases in a direction from the top surface 67 toward the base surface 66, in other words, in a direction toward the image display mechanism 12. In particular, in the embodiment illustrated in FIG. 17, the width of each thin conductive wire 60 continuously decreases in a direction from the top surface 67 toward the base surface 66, in other words, in a direction toward the image display mechanism 12. When the touch panel sensor 30 is incorporated into the display device 10 and the touch panel device 20 such that the top surface 67 faces the viewer as shown in FIG. 17, the blackened layer 62, disposed nearer to the viewer than the metal layer 61, can make the metal layer 61 more invisible. This makes it possible to enhance image contrast, thereby improving the visibility of images displayed by the image display mechanism 12.

From the viewpoint of making the metal layer 61 less visible by the blackened layer 62 and thereby enhancing image contrast, the width of each electrode 40 (thin conductive wire 60) need not change such that it solely decreases in a direction from the top surface 67 toward the base surface 66, in other words, in a direction toward the image display mechanism 12. Further, the width of each electrode 40 (thin conductive wire 60) need not continuously decrease in a direction from the top surface 67 toward the base surface 66, in other words, in a direction toward the image display mechanism 12. The metal layer 61 can be made less visible by the blackened layer 62 and image contrast can be enhanced also in the case where the width of each electrode 40 (thin conductive wire 60) first changes such that it solely decreases in a direction from the top surface 67 toward the base surface 66, and then changes such that it increases in a direction from the top surface 67 toward the base surface 66, i.e. in the case where the cross-sectional shape of each electrode 40 (thin conductive wire 60) is inversely tapered only in the vicinity of the top surface 67. Further, the metal layer 61 can be made less visible by the blackened layer 62 and image contrast can be enhanced also in the case where the width of each electrode 40 (thin conductive wire 60) first changes such that it solely increases in a direction from the top surface 67 toward the base surface 66, and then changes such that it decreases in a direction from the top surface 67 toward the base surface 66, i.e. in the case where the cross-sectional shape of each electrode 40 (thin conductive wire 60) is inversely tapered only in the vicinity of the base surface 66.

It has been found in the present inventors' studies that the width $W_2$ at the top surface 67, the width $W_1$ at the base surface 66, and the height H of the top surface 67 from the base surface 66 preferably satisfy the following relational expression:

$$1 \leq H/((W_2-W_1)/2) \leq 2$$

If $H/((W_2-W_1)/2)$ is less than 1, the adhesion of the electrodes 40 to the substrate 35 can be insufficient because of too large tapering of each electrode 40. It is therefore possible that, depending on the conditions under which the touch panel sensor 30 is used, an electrode(s) 40 may peel off from the substrate 35 and, in some cases, may be broken. On the other hand, if $H/((W_2-W_1)/2)$ exceeds 2, there may be an appreciable lowering of image contrast due to reflection of light from the side surfaces 68.

Inversely tapered electrodes 40 can be produced by using a metal oxide for the blackened film 82 in the production method described above with reference to FIG. 14: the blackened film 82 composed of a metal oxide is formed on the metal film 81, and the metal film 81 and the blackened film 82 are subjected to etching using the patterned resist film 83 as a mask. In general, compared to the metal film 81 composed of a metal material, the blackened film 82 composed of an oxide of the metal material is less eroded by etching. Accordingly, lateral erosion by side etching progresses more in the metal film 81 than in the blackened film 82. Further, lateral erosion by side etching in the metal film 81 progresses more in a region distant from the blackened film 82 and near the substrate 35 than in a region rear the blackened film 82. Therefore, the inversely tapered electrodes 40 shown in FIG. 17 can be produced by adjusting the etching time.

Figure 22:
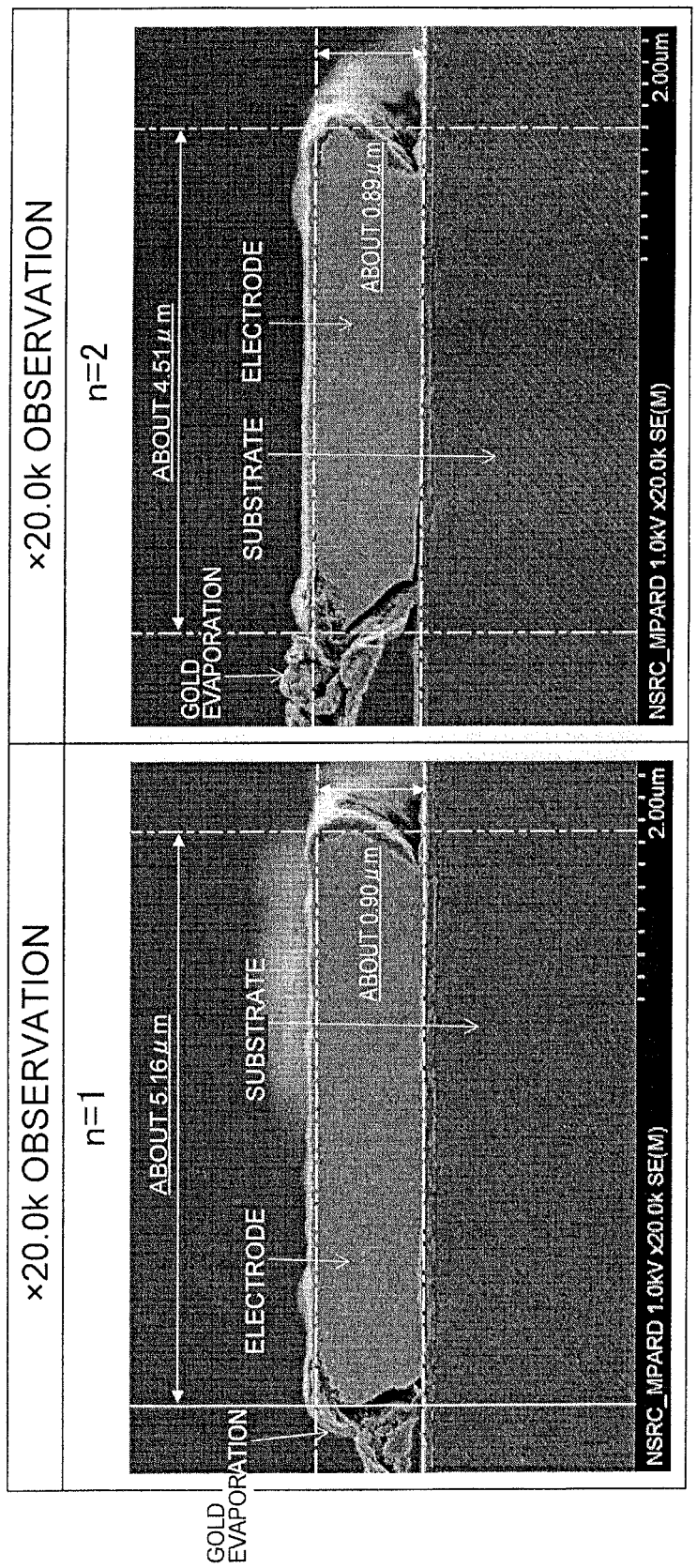
FIG. 22 is a scanning electron micrograph of a cross-section of an electrode.

FIG. 22 shows an exemplary inversely tapered electrode 40. FIG. 22 is a scanning electron microscopy (SEM) micrograph of a cross-section of the electrode. In the micrograph shown in FIG. 22, gold is vapor-deposited on the surface of the electrode 40 and on part of the surface of the substrate. The vapor-deposited gold layer is provided on the sample touch panel sensor for the sake of cross-sectional observation of the electrode by SEM, and thus is not a constituent element of the touch panel sensor.

While an exemplary mesh pattern of each conductive mesh 55, which is very effective for preventing moire and a dark/light pattern, has been described above, the mesh pattern of each conductive mesh 55 is not limited to the above-described exemplary one. Instead of the above-described construction, any known technique for preventing moire and a dark/light pattern may be appropriately applied to the conductive meshes 55. Moire and a dark/light pattern can be less visible depending on the width of the thin conductive wire 60 of each conductive mesh 55, the area of each conductive mesh 55, etc. Therefore, the thin conductive wires 60 of each conductive mesh 55 may be arranged not in the above-describe mesh pattern of each conductive mesh 55 but in a square lattice arrangement, a honeycomb arrangement, or the like.

Figure 18:
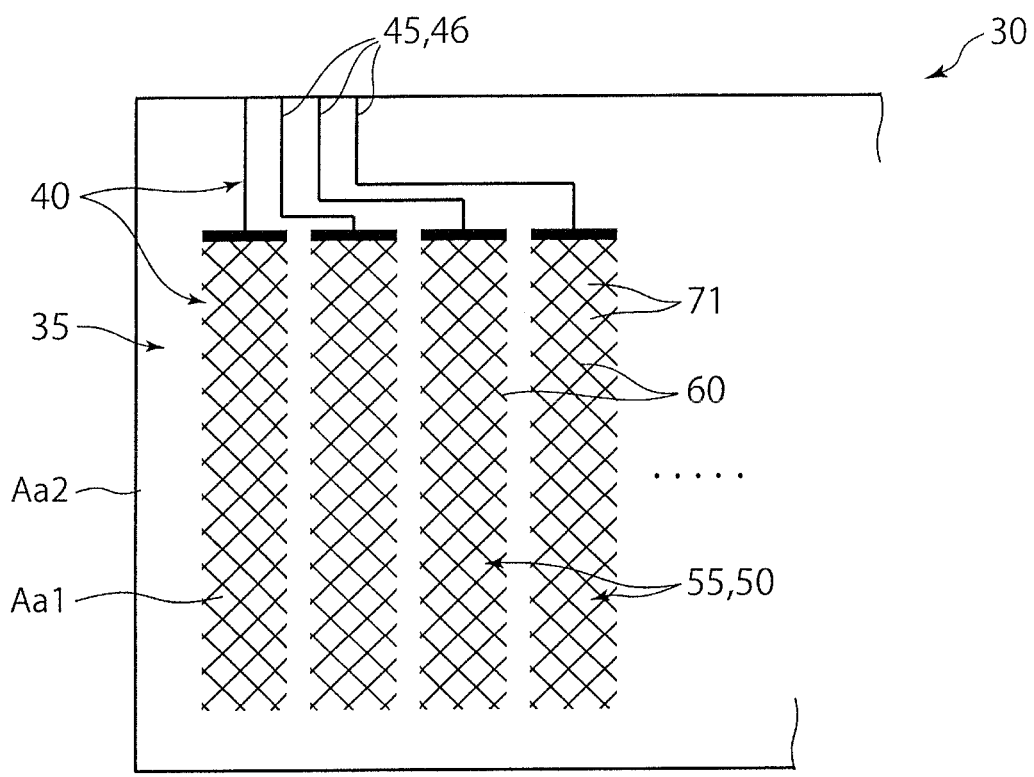
FIG. 18 is a diagram corresponding to FIG. 3, illustrating yet another variation of the touch panel sensor.

Though in the above-described embodiment the detection electrodes 50 are composed of the connecting wires 51 and the conductive meshes 55, the present invention is not limited to such detection electrodes 55. For example, as shown in FIG. 18, each detection electrode 50 may consist of a single conductive mesh 55 formed in an elongated area. In the embodiment illustrated in FIG. 18, the detection electrodes 50 are composed of a large number of conductive meshes 55 formed in stripe-shaped areas, and the extraction electrodes 45 are composed of extraction wires 46 connected to the conductive meshes 55.

Though in the above-described embodiment the projection capacitance touch panel device 20 comprises the first touch panel sensor 31 and the second touch panel sensor 32, the present invention is not limited to such a touch panel sensor. For example, as in the touch panel sensor 30 shown in FIG. 19, conductive meshes 55 may be formed in two-dimensionally arranged areas in an active area Aa1 defined on a substrate 35.

Figure 19:
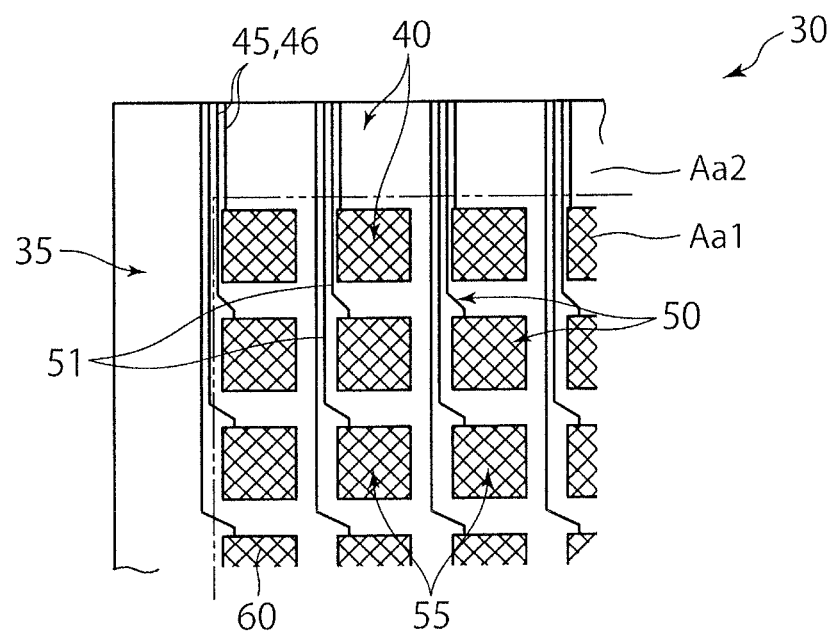
FIG. 19 is a diagram corresponding to FIG. 3, illustrating yet another variation of the touch panel sensor.
Figure 20:
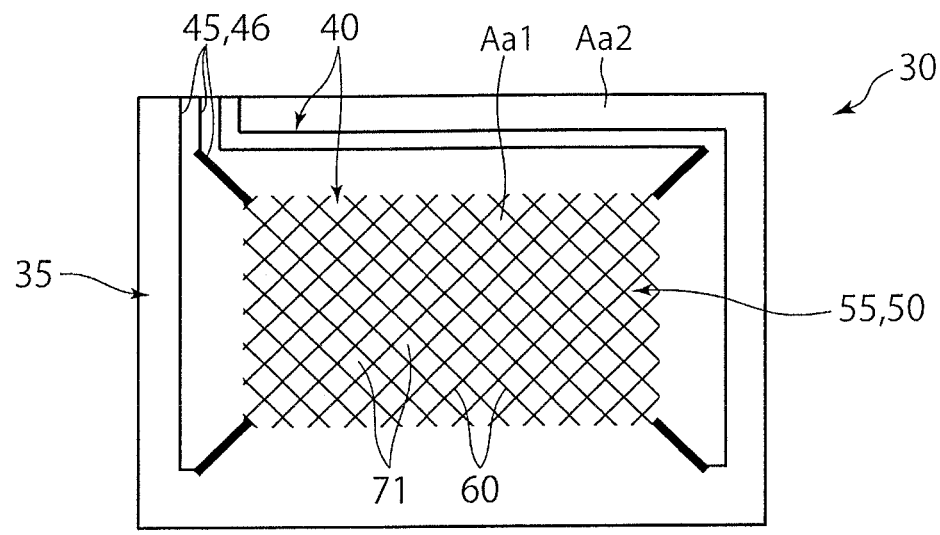
FIG. 20 is a diagram corresponding to FIG. 3, illustrating yet another variation of the touch panel sensor.

In the embodiment illustrated in FIG. 19, each conductive mesh 55 is connected via a connecting wire 51 to a corresponding extraction wire 46. In the embodiment illustrated in FIG. 20, a single conductive mesh 55 is formed in the entire area of an active area Aa1 defined on a substrate 35. The conductive mesh 55, from the four corners, is connected to extraction wires 46. Thus, the touch panel sensor 30 shown in FIG. 19 constitutes a surface capacitance touch panel.

The modifications described above can of course be made in an appropriate combination to the above-described embodiment.

The invention claimed is:
1. A touch panel sensor comprising:
a substrate; and
an electrode provided on a surface of the substrate and having a detection electrode used in positional detection and an extraction electrode connected to the detection electrode, wherein the electrode, in any cross-section thereof in a thickness direction, includes a metal layer which occupies at least part of the cross-section,
wherein the detection electrode includes a conductive mesh having first conductors and open areas, the first conductors having a height/width aspect ratio in a cross-sectional shape of 0.04 to 2.00,
wherein the first conductors have a first surface on the substrate side and a second surface located opposite to the first surface,
wherein each of the first conductors includes a first blackened layer on or in the second surface,
wherein the extraction electrode includes second conductors each having a third surface on the substrate side and a fourth surface located opposite to the third surface,
wherein each of the second conductors includes a second blackened layer on or in the fourth surface,
wherein the first and second conductors are the same material,
wherein the first and second conductors have the same thickness,
wherein the first and second blackened layers are the same material,
wherein a width of the second conductors is larger than a width of the first conductors, and
wherein a width of the second blackened layer is larger than a width of the first blackened layer.

2. The touch panel sensor according to claim 1, wherein the first conductors also include a third blackened layer on or in the first surface.

3. The touch panel sensor according to claim 1, wherein a difference between a width W2 of the first conductors at the second surface and a width W1 of the first conductors at the first surface is not more than 1 µm.

4. The touch panel sensor according to claim 1, wherein a width of the first conductors at the second surface is W2, a width of the first conductors at the first surface is W1, H is a height of the second surface measured from the surface of the substrate, and the following expression is satisfied:

$$1 \le H/((W2-W1)/2) \le 2.$$

5. The touch panel sensor according to claim 1, wherein the first conductors are formed of copper.

6. The touch panel sensor according to claim 1, wherein a height of the second surface of the conductors measured from the surface of the substrate is 0.1 µm to 2.0 µm.

7. The touch panel sensor according to claim 1, wherein a surface resistivity of the conductive mesh is not more than 50 Ω/□.

8. The touch panel sensor according to claim 1, wherein the substrate is formed of polyethylene terephthalate.

9. The touch panel sensor according to claim 1, wherein a thickness of the substrate is 20 µm to 500 µm.

10. The touch panel sensor according to claim 1, wherein a thickness of the substrate is 30 µm to 400 µm.

11. A touch panel sensor comprising:
a substrate; and
an electrode provided on a surface of the substrate and having a detection electrode used in positional detection and an extraction electrode connected to the detection electrode,
wherein the electrode, in any cross-section thereof in a thickness direction, includes a metal layer which occupies at least part of the cross-section,
wherein the detection electrode includes a conductive mesh having first conductors and open areas, the first conductors having a height/width aspect ratio in a cross-sectional shape of 0.04 to 2.00,
wherein the first conductors have a first surface on the substrate side and a second surface located opposite to the first surface,
wherein each of the first conductors includes a first blackened layer on or in the first surface,
wherein the extraction electrode includes second conductors each having a third surface on the substrate side and a fourth surface located opposite to the third surface,
wherein each of the second conductors includes a second blackened layer on or in the third surface,
wherein the first and second conductors are the same material,
wherein the first and second conductors have the same thickness,
wherein the first and second blackened layers are the same material,
wherein a width of the second conductors is larger than a width of the first conductors, and
wherein a width of the second blackened layer is larger than a width of the first blackened layer.

12. The touch panel sensor according to claim 11, wherein a difference between a width W2 of the first conductors at the second surface and a width W1 of the first conductors at the first surface is not more than 1 µm.

13. The touch panel sensor according to claim 11, wherein a width of the first conductors at the second surface is W2, a width of the first conductors at the first surface is W1, H is a height of the second surface measured from the surface of the substrate, and the following expression is satisfied:

$$1 \le H/((W2-W1)/2) \le 2.$$

14. The touch panel sensor according to claim 11, wherein the first conductors are formed of copper.

15. The touch panel sensor according to claim 11, wherein a height of the second surface of the conductors measured from the surface of the substrate is 0.1 µm to 2.0 µm.

16. The touch panel sensor according to claim 11, wherein a surface resistivity of the conductive mesh is not more than 50 Ω/□.

17. The touch panel sensor according to claim 11, wherein the substrate is formed of polyethylene terephthalate.

18. The touch panel sensor according to claim 11, wherein a thickness of the substrate is 20 µm to 500 µm.

19. The touch panel sensor according to claim 11, wherein a thickness of the substrate is 30 µm to 400 µm.

* * * * *